US006210783B1

(12) United States Patent
Malhotra et al.

(10) Patent No.: US 6,210,783 B1

(45) Date of Patent: Apr. 3, 2001

(54) INK JET TRANSPARENCIES

(75) Inventors: Shadi L. Malhotra; Raymond W. Wong; Walter Mychajlowskij, all of Mississauga; Daniel A. Foucher, Toronto, all of (CA)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/118,961

(22) Filed: Jul. 17, 1998

(51) Int. Cl.[7] .......... B32B 7/02

(52) U.S. Cl. .......... 428/212; 428/175; 428/500

(58) Field of Search .......... 428/537.5, 211, 428/195, 411.1, 76, 124, 174, 212, 484, 500; 347/105

(56) References Cited

U.S. PATENT DOCUMENTS

| | | | | |
|---|---|---|---|---|
| 4,251,824 | | 2/1981 | Hara et al. | 346/140 R |
| 4,308,547 | | 12/1981 | Lovelady et al. | 346/140 R |
| 4,410,899 | | 10/1983 | Haruta et al. | 346/140 R |
| 4,412,224 | | 10/1983 | Sugitani | 346/1.1 |
| 4,532,530 | | 7/1985 | Hawkins | 346/140 R |
| 4,601,777 | | 7/1986 | Hawkins et al. | 156/626 |
| 4,697,195 | | 9/1987 | Quate et al. | 346/140 R |
| 4,751,529 | | 6/1988 | Elrod et al. | 346/140 R |
| 4,751,530 | | 6/1988 | Elrod et al. | 346/140 R |
| 4,751,534 | | 6/1988 | Elrod et al. | 346/140 R |
| 4,775,594 | | 10/1988 | Desjarlais | 428/421 |
| 4,797,693 | | 1/1989 | Quate | 346/140 R |
| 4,801,473 | | 1/1989 | Creagh et al. | 427/164 |
| 4,801,953 | | 1/1989 | Quate | 346/140 R |
| 4,877,676 | | 10/1989 | Creagh et al. | 428/204 |
| 4,956,225 | | 9/1990 | Malhotra | 428/216 |
| 4,997,697 | | 3/1991 | Malhotra | 428/195 |
| 5,028,937 | | 7/1991 | Khuri-Yakub et al. | 346/140 R |
| 5,041,849 | | 8/1991 | Quate et al. | 346/140 R |
| 5,320,902 | | 6/1994 | Malhotra et al. | 428/342 |
| 5,624,743 | | 4/1997 | Malhotra | 428/216 |
| 5,672,424 | | 9/1997 | Malhotra et al. | 428/325 |
| 5,683,793 | * | 11/1997 | Malhotra et al. | 428/216 |
| 5,702,804 | * | 12/1997 | Malhotra | 428/195 |
| 5,712,027 | * | 1/1998 | Ali et al. | 428/212 |
| 5,729,266 | | 3/1998 | Malhotra | 347/102 |
| 5,897,940 | * | 4/1999 | Malhotra et al. | 428/212 |
| 5,919,552 | * | 6/1999 | Malhotra | 428/195 |

* cited by examiner

*Primary Examiner*—Bruce H. Hess
*Assistant Examiner*—Michael Grendzynski
(74) *Attorney, Agent, or Firm*—E. O. Palazzo

(57) ABSTRACT

Disclosed is a transparency comprised of a supporting substrate, and thereover and thereunder two coatings, a first heat dissipating antistatic coating layer in contact with the substrate, and wherein the first coating contains a heat dissipating binder optionally with a melting point, for example, in the range of from about 100 to about 260° C., and an antistatic compound and a second ink receiving coating layer thereover containing a blend of a binder polymer, an alkylated oxazoline, a lightfastness compound, and an optional biocide.

29 Claims, No Drawings

INK JET TRANSPARENCIES

BACKGROUND OF THE INVENTION

The present invention is directed to transparencies, and more specifically, to high projection efficiency, low haze, lightfast and waterfast ink jet transparencies with improved ink absorption and acceptable ink spreading when used in combination with liquid ink compositions and solid ink hot melt ink compositions, such as those selected for thermal ink jet printing processes, and acoustic ink jet printing processes, reference for example copending application U.S. Ser. No. 09/118,573, the disclosure of which is totally incorporated herein by reference. In embodiments of the present invention, the transparencies are comprised of a supporting substrate, such as MYLAR™, thereover two coatings, a first antistatic heat resistant coating layer which comprises a binder with a melting point of, for example, in the range of from about 100° C. to about 300° C. and preferably from about 150° C. to 260° C., and, for example, a quaternary compound, and a second light resistant, humidity resistant ink receiving coating layer situated so that the first coating layer is between the second light resistant, humidity resistant ink receiving coating layer and the substrate, the second coating layer being comprised of, for example, a polymer such as poly(2-ethyl-2-oxazoline); 1-[N-[poly(3-allyloxy-2-hydroxy propyl)]-2-imidazolidinone], poly(1-vinylpyrrolidone)-graft-(1-triacontene), or poly(1-vinylpyrrolidone)-graft-(1-hexadecene), a lightfast UV compound such as (2,4-dichloro-6-morpholino-1,3,5-triazine), and copolymers thereof of poly[N,N-bis(2,2,6,6-tetramethyl-4-piperidinyl)-1,6-hexane diamine-co-2,4-dichloro-6-morpholino-1,3,5-triazine), and mixtures thereof, a biocide and an ink spreading compound selected, for example, from the group consisting of mono and dialkylated oxazolines, wherein the alkyl chain length varies between about 2 to about 30 carbons (about includes all values in between throughout) and the melting point of these oxazolines is, for example, between about 40° C. to about 80° C. and preferably wherein the two coatings, thus a total of four coatings, are present on each surface of the supporting substrate. These transparencies, for example, enable lightfast transparent colored images when printed with inks comprised, for example, of a vehicle such as mono and di alkylated oxazolines, a colorant, such as an alkylated colorant, like mono, di, tri and tetra alkylated dyes and an alkylated antioxidant, such as didodecyl-3,3'-thiodipropionate.

With the transparencies of the present invention, there are enabled a number of advantages, including the important advantages of high projection efficiency primarily because of improved flow of the oxazoline inks on the ink receiving layer containing low surface energy oxazoline compounds, and more specifically, in view of the low surface tension, for example about 30 to about 35 dynes/centimeter, of the ink receiving layer. Also, with the transparencies of the present invention, there are enabled a number of other advantages, including the important advantage of heat resistant characteristics for the transparencies when used in ink jet printers that employ heat or microwave energy for drying inks, low haze, that is, for example, wherein the transparencies permit greater than about 95 percent of the light to be transmitted therethrough in embodiments, and which transparencies possess excellent lightfast and waterfast characteristics. The transparencies of the present invention can also be selected for ink jet methods and apparatus, which employ aqueous inks.

PRIOR ART

Ink jet printing systems generally are of two types, continuous stream and a more common drop-on-demand. In drop-on-demand systems, a droplet is expelled from an orifice directly to a position on a recording medium in accordance with digital data signals. A droplet is not formed or expelled unless it is to be placed on the recording medium. Since drop-on-demand systems require no ink recovery, charging, or deflection, they are much simpler than the continuous stream type. There are three types of drop-on-demand ink jet systems.

One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems, which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat-generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability. Thermal ink jet processes are well known and are described, for example, in U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

The third type of drop-on-demand system is known as acoustic ink printing. In acoustic ink jet printing, an acoustic beam exerts a radiation pressure against features upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, *IBM Technical Disclosure Bulletin,* Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is accomplished by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive primarily because it does not require the nozzles or the small ejection orifices which have caused many of the reliability and pixel placement accuracy problems that conventional drop on demand and continuous stream ink jet printers have suffered.

Pixel placement accuracy problems exist with conventional drop on demand and continuous stream ink jet printers. The size of the ejection orifice is an important design parameter of an ink jet since it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying print heads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of print head configurations, including (1) single ejector embodiments for raster scan printing, (2) matrix configured ejector arrays for matrix printing, and (3) several different types of page width ejector arrays, ranging from (i) single row, sparse arrays for hybrid forms of parallel/serial printing to (ii) multiple row staggered arrays with individual ejectors for each of the pixel positions or addresses within a page width image field (i.e., single ejector/pixel/line) for ordinary line printing. Inks suitable for acoustic ink jet printing typically are liquid at ambient temperatures (i.e., about 25° C.), however, in other embodiments the ink is in a solid state at ambient temperatures and provision is made for liquefying the ink by heating or any other suitable method prior to introduction of the ink into the print head. Images of two or more colors can be generated by several methods, including by processes wherein a single print head launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.,* vol. 65, no. 9 (May 1, 1989) and references therein, the disclosure of which is totally incorporated herein by reference. In this process, the print head produces approximately 2.2 pico liter droplets by an acoustic energy process.

The inks used in acoustic process can be aqueous or hot melt. The aqueous inks employed in acoustic ink jet printing are similar to those used in the piezoelectric devices where the inks have a surface tension of greater than about 50 dynes/centimeters. When hot melt type inks are used in the acoustic ink jet printing their acoustic loss should be less than about 40 dB/millimeters. The ink under these conditions should display a melt viscosity of from about 5 to about 20 centipoise or less at the jetting temperature. Furthermore, once the ink is jetted onto the paper, the ink image should be of excellent crease property, and should be non-smearing, waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can tolerate a temperature up to about 180° C., and preferably up to a temperature of from about 140° C. to about 160° C., the vehicle for the ink should preferably display liquid like properties, such as a viscosity of 1 to about 10 centipoise at a temperature of from about 75° C. to about 165° C., and solidify or harden after jetting onto paper such that the ink displays a hardness value of for example, from about 0.1 to about 0.5 millimeter utilizing a penetrometer according to the ASTM penetration method D1321.

In view of the varying chemical and physical differences in the ink compositions employed in continuous ink jet printing, thermal ink jet printing and acoustic ink jet printing the substrate requirements, such as for papers and transparencies, also vary. Thus, it is not always feasible to use the substrates designed for aqueous inks selected for thermal ink jet printing in a printer that employs hot melt type inks.

U.S. Pat. No. 4,801,473 and U.S. Pat. No. 4,877,676, the disclosures of each of which are totally incorporated herein by reference, disclose hot melt ink transparencies which include a transparent substrate of a polyester material, an ink pattern disposed on one surface of the transparent sheet in the form of three-dimensional ink spots having curved surfaces, and a transparent layer covering the ink spots, and which layer has an index of refraction approximately the same as that of the ink spots. The transparent layer is applied to the substrate and the ink spots in the form of a liquid coating which wets the surfaces of the substrate and the ink spots, and spreads thereover to provide a transparent layer having a maximum deviation of about 20 degrees from a plane parallel to the substrate.

U.S. Pat. No. 4,775,594, the disclosure of which is totally incorporated herein by reference, discloses a polyester ink jet recording sheet for the production of a transparency obtained by coating the sheet with a clear layer, including a nonvolatile organic acid selected from citric acid, glycolic acid, malonic acid, tartaric acid, maleic acid, fumaric acid, malic acid, and succinic acid. A coating composition for preparing the clear layer on the recording sheet is comprised of for example, in addition to the organic acid, a water soluble resin selected from poly(vinylpyrrolidone), poly (acrylic acid), polyacrylamide, hydroxyethyl cellulose, carboxymethyl cellulose, and vinyl acetate-vinylpyrrolidone copolymer, a water insoluble resin selected from polyesters, poly(vinylbutyral) resin, polyketone resins, carboxylated resins, nitrocellulose polymers, styrenated acrylic polymers, allyl alcohol-styrene copolymers, and a fluorinated surfactant.

U.S. Pat. No. 4,956,225 discloses a transparency suitable for electrographic and xerographic imaging which comprises a polymeric substrate with a toner receptive coating on one surface thereof comprising blends selected from the group consisting of poly(ethylene oxide) and carboxymethyl cellulose; poly(ethylene oxide), carboxymethyl cellulose, and hydroxypropyl cellulose; poly(ethylene oxide) and vinylidene fluoride/hexafluoropropylene copolymer; poly (chloroprene) and poly(alpha-methylstyrene); poly (caprolactone) and poly(alpha-methylstyrene); poly(vinyl isobutyl ether) and poly(alpha-methylstyrene); poly (caprolactone) and poly(p-isopropyl alpha-methylstyrene); blends of poly(1,4-butylene adipate) and poly(alpha-methylstyrene); chlorinated poly(propylene) and poly (alpha-methylstyrene); chlorinated poly(ethylene) and poly (alpha-methylstyrene); and chlorinated rubber and poly (alpha-methyl styrene).

U.S. Pat. No. 4,997,697 discloses a transparent substrate material for receiving or containing an image which comprises a supporting substrate base, an antistatic polymer layer coated on one or both sides of the substrate and comprising hydrophilic cellulosic components, and a toner receiving polymer layer contained on one or both sides of the antistatic layer, which polymer comprises hydrophobic cellulose ethers, hydrophobic cellulose esters, or mixtures thereof, and wherein the toner receiving layer contains adhesive components.

While the above transparencies are suitable for their intended purposes, a need remains for transparencies with improved high projection efficiency such as a projection efficiency greater than about 90 percent. In addition, a need remains for heat resistant transparencies particularly suitable for use in ink jet and electrophotographic applications that employ heat and microwave energy to fix inks and toners. Further, a need remains for transparencies that can be used in printers that employ solid hot melt inks. In addition, a need remains for transparencies with excellent low haze characteristics, such as haze value of between from about 0.5 to about 10 and preferably between 0.5 to 5, a feature not easily obtained. There is also a need for transparencies with excellent waterfastness and excellent lightfastness in the range of from about 80 to about 98 percent, and a need for transparencies wherein colors can be satisfactorily projected. A need also remains for transparencies which are particularly suitable for use in printing processes wherein the recorded transparencies are imaged with liquid and solid inks and dried by exposure to radiant heat or microwave radiation. Further, there is a need for transparencies coated with a discontinuous, porous film. There is also a need for transparencies that, subsequent to being imaged with an aqueous liquid or solid ink, exhibit reduced curling. These and other needs may be achievable with the transparencies of the present invention in embodiments thereof.

PATENTS AND PENDING APPLICATIONS

U.S. Pat. No. 5,729,266, the disclosure of which is totally incorporated herein by reference, discloses a recording sheet which comprises a substrate and a material selected from the group consisting of oxazole compounds, isooxazole compounds, oxazolidinone compounds, oxazoline salt compounds, morpholine compounds, thiazole compounds, thiazolidine compounds, thiadiazole compounds, phenothiazine compounds, and mixtures thereof. Also, disclosed is a recording sheet comprised of a substrate, at least one material selected from the group consisting of oxazole compounds, isooxazole compounds, oxazolidinone compounds, oxazoline salt compounds, morpholine compounds, thiazole compounds, thiazolidine compounds, thiadiazole compounds, phenothiazine compounds, and mixtures thereof, an optional binder, an optional antistatic agent, an optional biocide, and an optional filler.

Copending application U.S. Ser. No. 657,218, the disclosure of which is totally incorporated herein by reference, discloses a transparency comprised of a supporting substrate, and thereover and thereunder two coatings, a first heat dissipating and fire resistant coating layer in contact with the substrate, and wherein said first coating is comprised of a binder with a melting point in the range of from about 100° C. to about 275° C. and a heat dissipating fire retardant component; and in contact with each of said first layers a second ink receiving coating layer thereover comprising a blend of a binder polymer, a cationic component capable of complexing with ink composition dyes, a lightfast agent, a filler, a biocide, and an ink spreading fluoro compound containing from 1 to about 25 fluorines and wherein said fluoro compound possesses a melting point of between about 50° C. and about 100° C.

U.S. Pat. No. 5,624,743, the disclosure of which is totally incorporated herein by reference, discloses a transparency comprised of a supporting substrate, thereover a first coating layer comprised of a binder having a glass transition temperature of less than about 55° C., a cellulosic viscosity modifier, a lightfast agent and a biocide; and a second ink-receiving coating layer comprised of a hydrophilic binder, an oxyalkylene containing compound, a dye mordant, an optional filler, and an optional biocide; and wherein the first coating is in contact with the substrate and is situated between the substrate and the second ink coating, and which transparency possesses a haze value of from about 1 to about 10 and a lightfast value of from about 80 to about 95.

U.S. Pat. No. 5,672,424, the disclosure of which is totally incorporated herein by reference, discloses a transparency comprised of a supporting substrate, thereover a first coating layer comprised of an anionic layer that adheres well to the substrate; and a second cationic layer situated on the top of the first anionic layer that binds with the anionic layer and comprised of cationic quaternary monomers and polymers and a lightfast agent; and a third ink receiving layer situated on the top of the second cationic layer and comprised of block copolymers and graft polymers, a biocide and a filler; which transparency possesses a haze value of from about 0.5 to about 10 and a lightfast value of from about 95 to about 98.

U.S. Pat. No. 5,683,793, the disclosure of which is totally incorporated herein by reference, discloses a transparency comprised of a supporting substrate, thereover a first coating layer comprised of an ink absorbing layer and a biocide; and a second ink spreading coating layer comprised of a hydrophilic vinyl binder, a dye mordant, a filler, an optional lightfast agent and an ink spot size increasing agent selected from the group consisting of hydroxy acids, amino acids and polycarboxyl acids; and wherein the first coating is in contact with the substrate and is situated between the substrate and the second ink coating, and which transparency possesses a haze value of from about 0.5 to about 10 and a lightfast value of from about 95 to about 98. The appropriate components and processes of these copending applications may be selected for the invention of present application in embodiments thereof.

The disclosures of each of the patents and applications recited herein are totally incorporated herein by reference in their entirety.

SUMMARY OF THE INVENTION

It is a feature of the present invention to provide transparencies with many of the advantages illustrated herein.

It is an feature of the present invention to provide transparencies with high projection efficiency such as projection efficiency in the range of, for example, from between about 90 to about 95 percent (from about, and between from about, encompass all the values in between throughout).

It is another feature of the present invention to provide heat resistant transparencies particularly suitable for use in electrophotographic and ink jet applications that employ heat and microwave energy to fix inks and toners.

It is another feature of the present invention to provide transparencies particularly suitable for ink jet printers employing solid hot melt wax colored inks.

It is another feature of the present invention to provide transparencies with waterfast and lightfast images.

It is yet another feature of the present invention to provide transparencies with low haze characteristics, such as from about 0.5 to about 10, and wherein the color gamut is acceptable and does not substantially change.

Moreover, another feature of the present invention is to provide transparencies with the combination of excellent lightfast properties, such as from about 90 to about 98, and low haze characteristics, such as from about 0.5 to about 10 and preferably from about 0.5 to about 5, wherein the color gamut is acceptable and does not substantially change.

These and other features of the present invention can be accomplished in embodiments thereof by providing transparencies with coatings thereover. More specifically, the transparencies of the present invention are comprised of a supporting substrate, and thereover two coatings, a first coating layer which comprises a mixture of a heat dissipating binder and an anionic or cationic antistatic compound, and a second light resistant, humidity resistant ink receiving coating layer preferably situated so that the first coating layer is between the second coating layer and the substrate, the second coating layer comprising a blend of a binder polymer, a lightfast UV absorbing compound, a biocide, and an ink spreading agent selected from the group consisting of, for example, mono and dialkylated oxazolines wherein the alkyl chain length varies between about 2 to about 30 carbons and the melting point of these oxazolines vary, for example between about 40° C. to about 80° C., and preferably wherein the two coatings are present on each surface of the supporting substrate.

The present transparencies coated with, for example, poly(2-ethyl-2-oxazoline); 1-[N-[poly(3-allyloxy-2-hydroxypropyl)]-2-imidazolidinone]; poly(1-vinylpyrrolidone)-graft-(1-triacontene); poly(1-vinylpyrrolidone)-graft-(1-hexa decene) are ideal for oxazoline based inks selected for acoustic ink jet printing and such transparencies provide, for example, a high projection efficiency, such as between 92 to 95 percent images, as compared to a number of prior art coatings where these values range, for example, from about 50 to about 60 percent.

Aspects of the present invention relate to a transparency comprised of a supporting substrate, and thereover coatings of preferably (1) a first heat dissipating coating layer in contact with the substrate, and wherein said first coating is comprised of a heat dissipating binder with a melting point in the range of from between about 100° C. to about 260° C. and an antistatic compound; and (2) a second ink receiving coating layer thereover comprised of a blend of a binder polymer, and a second component, such as an alkylated oxazoline compound with a melting point of, for example, between about 40° C. to about 80° C., a lightfast UV compound, and a biocide; a transparency comprised of a supporting substrate, thereover and thereunder a first coating layer which dissipates heat and is substantially antistatic, and which first coating is comprised of a heat dissipating binder with a melting point of from about 100° C. to about 260° C. and an antistatic compound, and wherein said binder is present in amounts of, for example, throughout with regard to the parts of each component, from about 5 parts by weight to about 95 parts by weight, and said antistatic compound is present in amounts of from about 95 parts by weight to about 5 parts by weight; and a second ink receiving coating layer situated on each of said first heat dissipating antistatic layers, and which second coating is comprised of a blend of a binder polymer, an ink spreading alkylated oxazoline compound with a melting point of between about 40° C. to about 80° C., a lightfast UV compound, and a biocide; a transparency and wherein said substrate contains thereunder said two coatings and thereover said two coatings; a transparency wherein the binder of the first heat dissipating antistatic layer is a polymer selected from the group consisting of (1) halogenated polystyrene, (2) poly[penta bromobenzyl] acrylate, (3) halogenated polyesters, (4) halogenated polyureas, (5) halogenated epoxy resins, (6) cellulose acetate hydrogen phthalates, (7) hydroxypropylmethyl cellulose phthalate, (8) polyethylenecarbonate, (9) polyester latex, and (10) a butadiene-acrylonitrile-styrene terpolymer latex, a transparency wherein the coatings are contained thereover and thereunder a supporting substrate, and the binder of the first heat dissipating layer is a polymer selected from the group consisting of (1) poly[penta bromobenzyl]acrylate, (2) halogenated polyesters, (3) halogenated polyureas, (4) halogenated epoxy resins, and (5) polyethylenecarbonate, and wherein said polymer is present in amounts of from about 50 to about 95 parts by weight; a transparency wherein said antistatic compound is selected from the group consisting of anionic compounds and cationic compounds; a transparency wherein the heat dissipating compound of the first layer is selected from the group consisting of (1) poly[pentabromo benzyl]acrylate, (2) halogenated polyesters, and (3) halogenated polyureas, and which component is present in amounts of from about 50 to about 5 parts by weight; a transparency wherein the thickness of the first heat dissipating coating layer in contact with the substrate is from about 0.1 to about 25 microns; a transparency wherein the binder polymer for the second ink receiving layer is selected from the group consisting of (1) poly(2-ethyl-2-oxazoline, (2) 1-[N-[poly(3-allyloxy-2-hydroxypropyl)]-2-aminoethyl]-2-imidazolidinone, (3) poly(1-vinylpyrrolidone)-graft-(1-triacontene), (4) poly(1-vinyl pyrrolidone)-graft-(1-hexadecene), (5) poly(coumaronone-co-indene), and mixtures thereof, and which binder polymer is present in amounts of from about 20 parts by weight to about 82 parts by weight; a transparency wherein the binder polymer of the second ink receiving layer situated on the top of the first heat dissipating layer is selected from the group consisting of (1) poly(2-ethyl-2 -oxazoline), (2) poly(1-vinylpyrrolidone)-graft-(1-triacontene), and (3) poly(1-vinyl pyrrolidone)-graft-(1-hexadecene); a transparency wherein said alkylated oxazoline compound of the ink receiving layer functions primarily as an ink spreading compound and which compound is selected from the group consisting of monoalkyloxazolines and dialkyloxazolines, wherein alkyl contains from about 2 to about 30 carbon atoms, and wherein said oxazoline possesses a melting point of between about 40° C. to about 65° C.; a transparency wherein the alkylated oxazoline compound of the ink receiving layer is selected from the group consisting (1) dodecyl oxazoline, (2) tetradecyl oxazoline, (3) triacontane oxazoline, (4) dihexyl oxazoline, (5) dioctyl oxazoline, (6) didecyl oxazoline, (7) didodecyl oxazoline, (8) ditetradecyl oxazoline, (9) distearyl oxazoline, and (10) ditriacontane oxazoline; and wherein said oxazoline is optionally present in amounts of from about 12 parts by weight to about 65 parts by weight; a transparency wherein said UV lightfast compound is selected from the group consisting of (1) 2-(2'-hydroxy-5'-methylphenyl)benzotriazole; (2) [1,2,2,6,6-pentamethyl-4-piperidinyl/β,β,β',β'-tetramethyl-3,9-(2,4,8,10-tetra oxospiro-(5,5)-undecane)diethyl]-1,2,3,4-butane tetracarboxylate; (3) 2-dodecyl-N-(1,2,2,6,6-pentamethyl-4-piperidinyl) succinimide; (4) poly(3,5-di-tert-butyl-4-hydroxy hydrocinnamic acid ester)/1,3,5-tris(2-hydroxyethyl)-5-triazine-2,4,6(1H,3H,5H)-trione; and (5) poly[N,N-bis(2,2,6,6tetramethyl-4-piperidinyl)-1,6-hexane diamine-co-2,4-dichloro-6-morpholino-1,3,5-triazine; a transparency wherein said UV compound is selected from the group consisting of (1) [1,2,2,6,6-pentamethyl-4-piperidinyl/β,β,β',β'-tetra methyl-3,9-(2,4,8,10-tetraoxospiro-(5,5)-undecane)diethyl]1,2,3,4-butane tetracarboxylate; (2) 2-dodecyl-N-(1,2,2,6,6-pentamethyl-4-piperidinyl) succinimide; (3) poly[N,N-bis(2,2,6,6-tetramethyl-4-piperidinyl)-1,6-hexane diamine-co-2,4-dichloro-6-morpholino-1,3,5-triazine; and wherein said UV compound is present in amounts of from about 5 parts by weight to about 12 parts by weight; a transparency wherein said biocide of the second ink receiving layer is selected from the group consisting of known biocides, such as (1) nonionic compounds, (2) anionic compounds, and (3) cationic compounds; a transparency wherein the biocide of the second ink receiving layer is selected from the group consisting of (1) nonionic 2-bromo-4'-hydroxyacetophenone; (2) anionic potassium N-hydroxy methyl-N-methyl-dithiocarbamate; (3) cationic poly(oxyethylene(dimethyl amino)-ethylene(dimethylamino)ethylene dichloride); and wherein said biocide is present in amounts of from about 1 part by weight to about 3 parts by weight; a transparency wherein the thickness of the second ink receiving coating layer in contact with the first layer is from about 0.1 to about 25 microns; a transparency with a haze value of from about 0.5 to about 5; a transparency with a lightfast value of from about 90 to about 98 percent; a transparency which possesses a haze value of from about 0.5 to about 5, a projection efficiency of about 90 to about 95 percent, and a lightfast value of from about 90 to about 98 percent; a transparency wherein the substrate is selected from the group consisting of (1) polyethylene terephthalate, (2) polyethylene naphthalates, (3) polycarbonates, (4) polysulfones, (5) polyether sulfones, (6) poly(arylene sulfones), (7) cellulose triacetate, (8) polyvinyl chloride, (9) cellophane, (10) polyvinyl fluoride, (11) polypropylene, and (12) polyimides, and other known components; a transparency wherein said melting point of said heat dissipating binder is from about 100° C. to about 200° C., and wherein said transparency possesses a haze value of from about 0.5 to about 10 and a lightfast value of from about 95 to about 98; a transparency wherein the first heat dissipating antistatic coating is a polymer of a poly[penta bromobenzyl] acrylate, a halogenated polyester, or a halogenated polyurea; said antistatic compound is monoester sulfosuccinate, or a quaternary acrylic copolymer latex; said second ink receiving layer polymer is poly(2-ethyl-2-oxazoline), poly(1-vinylpyrrolidone)-graft-(1-triacontene), or poly(1-vinyl pyrrolidone)-graft-(1-hexa decene); said alkylated oxazoline is triacontane oxazoline, didodecyl oxazoline, or distearyl oxazoline; said lightfast UV compound of the ink receiving layer is [1,2,2,6,6-pentamethyl-4-piperidinyl/β,β,β',β'-tetramethyl-3,9-(2,4,8,10-tetraoxospiro(5,5)-undecane) diethyl]-1,2,3,4-butane tetracarboxylate, or poly[N,N-bis(2,2,6,6-tetramethyl-4-piperidinyl)-1,6-hexane diamine-co-2,4-dichloro-6-morpholino-1,3,5-triazine; said biocide of the ink receiving layer is cationic poly(oxyethylene(dimethylamino)-ethylene (dimethylamino)ethylene dichloride), or an anionic potassium N-hydroxymethyl-N-methyl-dithiocarbamate, and which transparency possesses a haze value of from about 0.5 to about 10 and a lightfast value of from about 95 to about 98; a transparency wherein the first layer coating is of a thickness of about 10 microns, and contains about 85 percent by weight of poly[penta bromobenzyl] acrylate, and about 15 parts by weight of the anionic antistatic compounds monoester sulfosuccinate and an ink receiving layer in a thickness of about 10 microns on the heat dissipating antistatic coating layer comprised of a blend of about 80 parts by weight of poly(2-ethyl-2-oxazoline); about 13 parts by weight of ink spreading compound didecyl oxazoline; about 5 parts by weight of UV absorbing compound poly [N,N-bis(2,2,6,6-tetramethyl-4-piperidinyl)-1,6-hexane diamine-co-2,4-dichloro-6-morpholino-1,3,5-triazine]; and about 2 parts by weight of biocide 2-bromo-4'-hydroxyacetophenone, and which transparency possesses a haze value of from about 0.5 to about 10 and a lightfast value of from about 95 to about 98; a printing process which comprises (1) incorporating into an acoustic ink jet printing apparatus, containing a hot melt ink composition, a transparency which is comprised of a supporting substrate, and thereover two coatings, a first heat dissipating antistatic coating layer in contact with the substrate, and wherein said first coating is comprised of a heat dissipating binder with a melting point in the range of from about 100° C. to about 260° C. and an antistatic compound, and a second ink receiving coating layer thereover comprising a blend of a binder polymer, an alkylated oxazoline compound with a melting point of between about 40° C. to about 80° C., a lightfast UV compound, and a biocide; and (2) causing droplets of the ink to be ejected in an imagewise pattern onto the transparency; a printing process wherein there is selected a hot melt ink composition comprised of (a) an oxazoline vehicle, (b) an alkylated cyan, an alkylated magenta, and an alkylated yellow colorant, and (c) an antioxidant, and wherein the transparency selected is comprised of a first layer coating in a thickness of about 10 microns, and which coating is comprised of about 85 percent by weight of poly[penta bromobenzyl] acrylate, and about 15 parts by weight of the anionic antistatic compound monoester sulfosuccinate, and an ink receiving layer in a thickness of about 10 microns on the heat dissipating antistatic coating layer, and wherein said ink receiving layer is comprised of a blend of about 80 parts by weight of poly(2-ethyl-2-oxazoline), about 13 parts by weight of the ink spreading compound didecyl oxazoline, about 5 parts by weight of the UV absorbing compound poly[N,N-bis(2,2,6,6-tetramethyl-4-piperidinyl)-1,6-hexane diamine-co-2,4-dichloro-6-morpholino-1,3,5-triazine], and about 2 parts by weight of biocide 2-bromo-4'-hydroxyacetophenone; and (2) causing droplets of the ink to be ejected in an imagewise pattern onto the transparency, thereby generating images on the transparency, and which transparency possesses a haze value of from about 0.5 to about 10 and a lightfast value of from about 95 to about 98; a printing process wherein there are generated high density images that are resistant to light and to water; a transparency comprised of a supporting substrate, and thereover two coatings, (1) a first coating layer in contact with the substrate, and wherein said first coating is comprised of a binder and an antistatic compound; and (2) a second ink receiving coating layer thereover comprised of a blend of a binder polymer, an ink spreading component, a lightfast compound, and an optional biocide; a transparency wherein said ink spreading component is an oxazoline; a printing process wherein a transparency is selected and which transparency is comprised of a supporting substrate, and thereover two coatings, (1) a first coating layer in contact with the substrate, and wherein said first coating is comprised of a binder and an antistatic compound; and (2) a second ink receiving coating layer thereover comprised of a blend of a binder polymer, an ink spreading component, a lightfast compound, and a biocide; a transparency comprised of a supporting substrate, and thereover two coatings, a first heat dissipating antistatic coating layer in contact with the substrate, and wherein said first coating is comprised of a heat dissipating binder with a melting point in the range of, for example, from about 100° C. to about 260° C. and an anionic or cationic, antistatic compound, and a second ink receiving coating layer thereover comprising a blend of a binder polymer, a lightfastness compound, a biocide, and an ink spreading agent comprised of mono and dialkylated oxazolines wherein the alkyl chain length varies between about 2 to about 30 carbons, and the melting point of these oxazolines varies, for example, between about 40° C. to about 80° C.; a transparency comprised of a supporting substrate, thereover and thereunder a first antistatic coating layer which dissipates heat and is substantially heat resistant, and which first coating is comprised of a heat dissipating binder with a melting point in the range of from about 100° C. to about 260° C. and an anionic or cationic antistatic compound, and wherein the binder is present in amounts of from about 5 parts by weight to about 95 parts by weight and the antistatic compound is present in amounts of from about 95 parts by weight to about 5 parts by weight; and a second ink receiving coating layer situated on the top of the first heat dissipating antistatic layer, and which second coating is comprised of a blend of a binder polymer, an ink spreading alkylated oxazoline compound, a lightfast UV compound and a biocide, and which transparency possesses a haze value of from about 0.5 to about 5, a projection efficiency of between 90 to 95 percent, a lightfast value of between 90 to 98 percent; and a transparency comprised of a supporting substrate, and thereover and thereunder two coatings, a first heat dissipating coating layer in contact with the substrate, and wherein the first coating is comprised of a binder with a melting point in the range of from about 150° C. to about 200° C. and an antistatic compound, and a second ink receiving coating layer thereover comprising a blend of a binder polymer, an ink spreading alkylated oxazoline compound, a lightfast UV compound, and a biocide.

Examples of substrates include polyesters, including MYLAR™, polyethylene terephthalate available from E. I. DuPont de Nemours & Company, MELINEX™, polyethylene terephthalate available from imperial Chemicals, Inc., CELANAR™, polyethylene terephthalate available from Celanese Corporation, polyethylene naphthalates, such as Kaladex PEN films available from Imperial Chemical Industries, polycarbonates, such as LEXAN™ available from General Electric Company, polysulfones, such as those available from Union Carbide Corporation, polyether sulfones, such as UDEL™ available from Union Carbide Corporation, cellulose triacetate, polyvinylchloride cellophane, polyvinyl fluoride, polyimides, and the like, with a polyester, such as MYLAR™, being preferred primarily because of its availability and relatively low cost. The substrate can also be opaque, including opaque plastics, such as TESLIN™ available from PPG Industries, and filled polymers, available from ICI, with fillers such as oxides and sulfates.

The substrate, which preferably includes two coatings thereon, and two coatings thereunder in contact with the substrate, can be of any effective thickness. Typical thickness for the substrate is from about 50 to about 500 microns, and preferably from about 100 to about 125 microns, although the thickness may be outside these ranges.

The first layer coating composition, which comprises a binder with a melting point in the range of for example, from about 100° C. to about 260° C. and preferably from about 150° C. to about 200° C., include for example binders of polycarbonate, vinyl chloride-vinylidene chloride copolymers, such as #058 available from Scientific Polymer Products, and examples of anionic antistatic agents are Alkasurf SS-L7DE, Alkasurf SS-L-HE, Alkasurf SS-OA-HE, Alkasurf SS-L9ME, Alkasurf SS-DA4-HE, Alkasurf SS-1B-45, Alkasurf SS-MA-80, Alkasurf SS-NO, Alkasurf SS-0-40, Alkasurf SS-0-60PG, Alkasurf SS-0-70PG, Alkasurf SS-0-75, Alkasurf SS-TA, and the like, all available from Alkaril Chemicals. Examples of cationic antistatic compounds selected for the first coating layer include diamino alkanes, such as those available from Aldrich Chemicals, quaternary salts, such as Cordex AT-172 and others available from Finetex Corporation, and the like. The which blend is present on the front side of the substrate of the multilayered transparency in various effective thicknesses. Typically, the total thickness of this first coating layer is from about 0.1 to about 25 microns and preferably from about 0.5 to 10 microns, although the thickness may be outside of these ranges.

In the first coating composition, the heat dissipating binder or mixtures thereof can be present within the coating in any effective amount; typically, the binder or mixtures thereof are present in amounts of from about 5 parts by weight to about 95 parts by weight and the antistatic compounds are present in amounts of from about 95 parts by weight to about 5 parts by weight. More specifically, the heat dissipating binder or mixtures thereof are present in amounts of from about 50 parts by weight to about 90 parts by weight, and the antistatic compounds are present in amounts of from about 50 parts by weight to about 10 parts by weight.

The second layer ink receiving coating composition preferably situated on the top of the first heat dissipating coating layer comprises a blend of a binder polymer, an ink spreading compound preferably an alkylated oxazoline compound, a lightfast UV component, and a biocide and, which layer is selected in various effective thicknesses. Typically, the total thickness of the second coating layer is from about 0.1 to about 25 microns and preferably from about 0.5 to about 10 microns, although the thickness can be outside of these ranges. In the second coating composition, the binder components can be present within the coating in any effective amount, typically, however the binder or mixtures thereof are present in amounts of from about 5 parts by weight to about 93 parts by weight and preferably from about 20 parts by weight to about 82 parts by weight, although the amounts can be outside of this range. The ink spreading alkylated oxazoline compounds are, for example, present in the second layer coating composition in amounts of from about 70 parts by weight to about 5 parts by weight and preferably from about 65 parts by weight to about 12 parts by weight, although the amounts can be outside of this range. The lightfast compounds or mixtures thereof are present in the second coating composition in amounts of from about 20 parts by weight to about 1 part by weight and preferably from about 12 parts by weight to about 5 parts by weight, although the amounts can be outside of this range. The biocide of the second layer coating composition is present in amounts of from about 5 parts by weight to about 1 part by weight and preferably from about 3 parts by weight to about 1 part by weight, although the amounts can be outside of this range.

The aforementioned amounts can be determined, for example, as follows:

Various blends of the binder, the ink spreading agent, lightfast compound, fillers, and the biocide were prepared in solvent, such as water, ethanol, tetrahydrofuran, and coated on to various substrates, such as polyester sheets, to yield coated transparencies with a single layer thereover and thereunder. After drying these polyester sheets at 100° C., they were tested for coating adhesion to paper or MYLAR™, and printed with a Xerox Corporation ink jet test fixture to, for example, check print quality, drying times of the images, lightfast and intercolor bleed. The data was analyzed statistically for optimum range of compositions. A preferred composition range for the second layer coating of the transparency is the binder present in amounts of from about 20 parts by weight to about 82 parts by weight, the ink spreading alkylated oxazoline compound present in an amount of from about 65 parts by weight to about 12 parts by weight, the lightfast compound, or mixtures thereof present in amounts of from about 12 parts by weight to about 5 parts by weight, and the biocide compounds, or mixtures thereof present in amounts of from about 3 parts by weight to about 1 part by weight; total 100 parts (20+65+12+1) to (82+12+5+1).

The transparency can be comprised of a supporting substrate, and thereover two coatings, a first heat dissipating antistatic coating layer, which comprises a blend or mixture of a binder with a melting point of, for example, between about 100° C. and about 260° C. Binder examples are of polycarbonates, such as #035 available from Scientific Polymer Products; vinyl chloride-vinylidene chloride copolymers, such as #058 available from Scientific Polymer Products; substituted cellulose esters cellulose acetate hydrogen phthalate, such as #085 available from Scientific Polymer Product; hydroxypropylmethyl cellulose phthalate, such as HPMCP available from Shin-Etsu Chemical; hydroxypropyl methyl cellulose succinate, brominated epoxy resin, available as Thermoguard 212 from M&T Corporation, and the like. Dispersed in the binder is an antistatic agent such as an anionic antistatic agent such as Alkasurf SS-L7DE, Alkasurf SS-L-HE, Alkasurf SS-OA-HE, Alkasurf SS-L9ME, Alkasurf SS-DA4-HE, Alkasurf SS-1B-45, Alkasurf SS-MA-80, Alkasurf SS-NO, Alkasurf SS-0-40, Alkasurf SS-0-60PG, Alkasurf SS-0-70PG, Alkasurf SS-0-75, Alkasurf SS-TA, all available from Alkaril Chemicals; or cationic antistatic compounds such as diamino alkanes, such as those available from Aldrich Chemicals, quaternary salts, such as Cordex AT-172 available from Finetex Corporation. The blend is preferably present on the front side of the substrate of the multilayered transparency of the present invention in any effective thickness. Typically, the total thickness of the first coating layer is from about 0.1 to about 25 microns and preferably from about 0.5 to 10 microns, although the thickness can be outside of these ranges. In the first coating composition, binder or mixtures thereof can be present within the coating in any effective amount; typically, the binder or mixtures thereof are present in amounts of from about 5 parts by weight to about 95 parts by weight and this layer can include heat dissipating fire retardant compounds present in amounts of from about 95 parts by weight to about 5 parts by weight.

The second ink receiving coating layer can comprise a blend of (1) a binder polymer, such as poly(2-ethyl-2-oxazoline) [Aldrich #37,284-6; Aldrich #37,285-4; Aldrich #37,397-4]; 1-[N-[poly(3-allyloxy-2-hydroxypropyl)]-2-amino ethyl]-2-imidazolidinone] [Aldrich #41,026-8]; poly (1-vinylpyrrolidone)-graft-(1-triacontene) [Aldrich #43, 052-8]; poly(1-vinyl pyrrolidone)-graft-(1-hexadecene) [Aldrich #43,050-1]; and poly(coumaronone-co-indene) [Aldrich # 44,669-6]; (2) an ink spreading component, such as and preferably alkylated oxazoline compound such as dilauryl oxazoline, didecyl oxazoline which are synthesized by reacting lauric acid with tris(hydroxymethyl) amino methane in the presence of butyltin hydroxide oxide as the catalyst and by reacting capric acid with tris (hydroxymethyl) amino methane in the presence of butyltin hydroxide oxide as the catalyst; a lightfast UV compound, such as poly[N,N-bis(2,2,6,6-tetramethyl-4-piperidinyl)-1, 6-hexane diamine-co-2,4-dichloro-6-morpholino-1,3,5-triazine] (Cyasorb UV-3346, #41,324-0, available from Aldrich Chemical Company), 2-dodecyl-N-(2,2,6,6-tetramethyl-4-piperidinyl) succinimide (Cyasorb UV-3581, #41,317-8, available from Aldrich Chemical Company), 2-dodecyl-N-(1,2,2,6,6pentamethyl-4-piperidinyl) succinimide (Cyasorb UV-3604, #41,318-6, available from Aldrich Chemical Company), and a biocide, such as a cationic poly(oxyethylene (dimethylamino)-ethylene (dimethylamino) ethylene dichloride) (Busan 77 available from Buckman Laboratories Inc.), and a cationic blend of methylene bisthiocyanate and dodecyl guanidine hydrochloride (available as Slime-Trol RX-31, RX-32, RX-32P, RX-33, from Betz Paper Chem Inc.).

In one aspect, the present invention relates to a transparency with a first layer coating in a thickness of 10 microns, and comprised of 75 parts by weight of the polycarbonate, such as #035, having a melting point of 257° C. and available from Scientific Polymer Products, and 25 parts by weight of anionic antistatic compound monoester sulfosuccinate Alkasurf SS-L7DE, Alkasurf SS-L-HE, available from Alkaril Chemicals, and a second 10 micron thick ink receiving layer comprised of a binder poly(2-ethyl-2-oxazoline) [Aldrich #37,284-6], present in amounts of 85 parts by weight; an ink spreading didecyl oxazoline compound present in amounts of 13 parts by weight; a lightfast UV compound, poly[N,N-bis(2,2,6,6-tetramethyl-4-piperidinyl)-1,6-hexanediamine-co-2,4-dichloro-6-morpholino-1,3,5-triazine] (Cyasorb UV-3346, #41,324-0, available from Aldrich Chemical Company), present in amounts of 5 parts by weight, and the biocide poly (oxyethylene (dimethyl amino)-ethylene (dimethylamino) ethylene dichloride) (Busan 77 available from Buckman Laboratories Inc.) present in amounts of 2 parts by weight, and which transparency has a haze value of, for example, about 3, lightfast value of about 95 percent, and waterfast value of about 75 percent.

Examples of the first layer heat dissipating binder polymers, preferably in contact with both lateral surfaces of the substrate, include hydrophobic polymers vinyl alcohol-vinyl acetate copolymers, such as #379, Scientific Polymer Products, vinyl chloride-vinyl acetate-vinyl alcohol terpolymers, such as #064, #427, #428, Scientific Polymer Products, vinyl chloride-vinylidene chloride copolymers, such as #058, Scientific Polymer Products, vinylidene chloride-acrylonitrile copolymers, such as #395, #396, Scientific Polymer Products; cellulose acetate hydrogen phthalate, such as #085, Scientific Polymer Products, hydroxypropylmethyl cellulose phthalate, such as HPMCP Shin-Etsu Chemical, hydroxypropyl methyl cellulose succinate, such as HPMCS, Shin-Etsu Chemical, cellulose triacetate, such as #031, Scientific Polymer Products, cellulose acetate butyrate, such as #077, Scientific Polymer Products, styrene-allyl alcohol copolymers, such as #393, #394, Scientific Polymer Products, poly (methylmethacrylate), such as #037A, Scientific Polymer Products, poly(phenyl methacrylate), such as #227, Scientific Polymer Products, or polycarbonates, such as #035, Scientific Polymer Products, brominated polystyrene, Pyrochek LM, Pyrochek 60 PB, Pyrochek 68 PB, Ferro Corporation; poly[penta bromobenzyl] acrylate, FR-1025 Dead Sea Bromine Corporation; brominated polyesters, brominated epoxy resin, Thermoguard 212 , M&T Corporation, and condensed bromoacenaphthylene, Con-BACN f, Tosoh Corporation.

First layer binder polymer examples, preferably in contact with both lateral surfaces of the substrate, include hydrophilic polymers, such as polyester latexes, such as Eastman AQ 29D available from Eastman Chemical Company, vinyl chloride latex such as Geon 352 obtained from B. F. Goodrich Chemical Group, polystyrene latex such as DL6622A, DL6688A, and DL6687A obtained from Dow Chemical Company, butadiene-acrylonitrile-styrene terpolymer latex, such as Tylac synthetic rubber latex 68-513 available from Reichhold Chemicals Inc., and mixtures thereof.

Examples of the first layer antistatic compounds include both anionic and cationic materials present in an amount of from about 5 parts by weight to about 95 parts by weight and preferably of from about 5 parts by weight to about 50 parts by weight. Examples of anionic antistatic compounds are monoester sulfosuccinates, all commercially available from Alkaril Chemicals as, for example, Alkasurf SS-L7DE, Alkasurf SS-L-HE, Alkasurf SS-OA-HE, Alkasurf SS-L9ME, Alkasurf SS-DA4-HE, Alkasurf SS-1B-45, Alkasurf SS-MA-80, Alkasurf SS-NO, Alkasurf SS-0-40, Alkasurf SS-0-60PG, Alkasurf SS-0-70PG, Alkasurf SS-0-75, Alkasurf SS-TA, and the like. Examples of cationic antistatic compounds include diamino alkanes, such as those available from Aldrich Chemicals, quaternary salts, such as Cordex AT-172 available from Finetex Corp., quaternary acrylic copolymer latexes, or the like. Further, suitable as antistatic cationic components, monomeric or polymeric, are monoammonium compounds as disclosed in, for example, U.S. Pat. No. 5,320,902, the disclosure of which is totally incorporated herein by reference, including (A) tetradecyl ammonium bromide (Fluka 87582), tetradodecyl ammonium bromide (Fluka 87249), tetrahexadecyl ammonium bromide (Fluka 87298), tetraoctadecyl ammonium bromide (Aldrich 35,873-8), and the like; (B) 2-coco trimethyl ammonium chloride (Arquad C-33, C-33W, C-50 from Akzo Chemie), palmityl trimethyl ammonium -chloride (Adogen 444 from Sherex Chemicals), myristyl trimethyl ammonium bromide (Cetrimide BP Triple Crown America), benzyl tetradecyl dimethyl ammonium chloride (Arquad DM 14B-90 from Akzo Chemie), didecyl dimethyl ammonium bromide (Aldrich 29,801-8), dicetyl dimethyl ammonium chloride (Adogen 432CG, Sherex Chemicals), distearyl dimethyl ammonium methyl sulfate (Varisoft 137, 190-100P from Sherex Chemicals, Arosurf TA-100 from Sherex Chemicals), difatty acid isopropyl ester dimethyl ammonium methyl sulfate (Rewoquat CR 3099 from Rewo Quimica, Loraquat CR 3099 from Dutton and Reinisch), tallow dimethyl trimethyl propylene diammonium chloride (Tomah Q-D-T from Tomah), and N-cetyl, N-ethyl morpholinium ethosulfate (G-263 from ICI Americas).

Further, suitable as antistatic compounds are monomeric or polymeric, are phosphonium compounds, such as, for example, those disclosed in copending application U.S. Ser. No. 08/034,917, the disclosure of which is totally incorporated herein by reference, including bromomethyl triphenyl phosphonium bromide (Aldrich #26,915-8), [3-hydroxy-2-methyl propyl] triphenyl phosphonium bromide (Aldrich #32,507-4), 2-tetraphenyl phosphonium bromide (Aldrich #21,878-2), tetraphenyl phosphonium chloride (Aldrich #21,879-0), hexadecyl tributyl phosphonium bromide (Aldrich #27,620-0), and stearyl tributyl phosphonium bromide (Aldrich #29,303-2).

Examples of the binders of the second ink receiving layer situated on the top of the first heat dissipating antistatic layer in contact with the substrate and present in amounts of from about 5 parts by weight to about 93 parts by weight and preferably from about 20 parts by weight to about 82 parts by weight include poly(2-ethyl-2-oxazoline) [Aldrich #37,284-6; Aldrich #37,285-4; Aldrich #37,397-4]; 1-[N-[poly(3-allyloxy-2-hydroxypropyl)]-2-aminoethyl]-2-imidazolidinone] [Aldrich #41,026-8]; poly(1-vinylpyrrolidone)-graft-(1-triacontene) [Aldrich #43,052-8]; poly(1-vinyl pyrrolidone)-graft-(1-hexadecene) [Aldrich #43,050-1] and poly(coumaronone-co-indene) [Aldrich #44,669-6].

Ink spreading agents of the second ink receiving layer present in amounts of, for example, from about 70 parts by weight to about 5 parts by weight and preferably from about 65 parts by weight to about 12 parts by weight, include monoalkylated oxazolines where the alkyl chain varies from about 2 to about 30, such as hexyl oxazoline, octyl oxazoline, decyl oxazoline, dodecyl oxazoline, tetradecyl oxazoline, triacontane oxazoline; and dialkyl oxazolines where the alkyl chain varies from about 2 to about 25 carbons such as dihexyl oxazoline, dioctyl oxazoline, didecyl oxazoline, didodecyl oxazoline, ditetradecyl oxazoline, and the like and the melting point of the oxazolines can, for example, preferably vary between about 40° C. to about 80° C.

UV absorbing lightfast compounds for the second ink receiving layer are present, for example, in the second coating composition in amounts of from about 20 parts by weight to about 1.0 part by weight and preferably from about 12 parts by weight to about 5 parts by weight, and include (1) 2-(2'-hydroxy-5'-methylphenyl)benzotriazole, Tinuvin 900, Ciba Geigy Corporation; (2) [1,2,2,6,6-pentamethyl-4-piperidinyl/β,β,β',β'-tetramethyl-3,9-(2,4,8,10-tetra oxospiro-(5,5)-undecane)diethyl]-1,2,3,4-butane tetracarboxylate, Mixxim HALS 63, Fairmount Corporation; (3) 2-dodecyl-N-(1,2,2,6,6-pentamethyl-4-piperidinyl) succinimide, Cyasorb UV-3604, #41,318-6, Aldrich Chemical Company; (4) poly(3,5-di-tert-butyl-4-hydroxyhydro cinnamic acid ester)/1,3,5-tris(2-hydroxyethyl)-5-triazine-2, 4,6(1 H,3H,5H)-trione, Good-rite 3125, Goodrich Chemicals; and (5) poly[N,N-bis(2,2,6,6-tetra methyl-4-piperidinyl)-1,6-hexanediamine-co-2,4-dichloro-6morpholino-1,3,5-triazine], Cyasorb UV-3346, #41,324-0, Aldrich Chemical Company.

The biocide of the second layer coating composition present in amounts of, for example, from about 5 parts by weight to about 1 part by weight and preferably from about 3 parts by weight to about 1 part by weight, include nonionic biocides, such as (1) 2-hydroxypropylmethane thiosulfonate (Busan 1005, available from Buckman Laboratories Inc.); (2) 2-(thio cyanomethyl thio) benzothiazole (BUSAN 30WB, 72WB, available from Buckman Laboratories Inc.); (3) methylene bis(thiocyanate) (Metasol T-10, available from Calgon Corporation; AMA-110, available from Vinings Chemical Company; Vichem MBT, available from Vineland Chemical Company; Aldrich 10,509-0); (4) 2-bromo-4'-hydroxyacetophenone (BUSAN 90, available from Buckman Laboratories percent by weight) (BUSAN 93, available from Buckman Laboratories Inc.); anionic biocides, such as (1) anionic potassium N-hydroxy methyl-N-methyl-dithiocarbamate (available as BUSAN 40 from Buckman Laboratories Inc.); (2) an anionic blend of N-hydroxymethyl-N-methyl dithiocarbamate (80 percent by weight) and sodium 2-mercapto benzothiazole (20 percent by weight) (available as BUSAN 52 from Buckman Laboratories lnc.); (3) an anionic blend of sodium dimethyl dithiocarbamate, 50 percent by weight, and (disodium ethylenebis-dithiocarbamate), 50 percent by weight, (available as METASOL 300 from Calgon Corporation; AMERSTAT 272 from Drew Industrial Division; SLIME CONTROL F from Western Chemical Company); (4) an anionic blend of N-methyldithiocarbamate, 60 percent by weight, and disodium cyano dithioimidocarbonate, 40 percent by weight, (available as BUSAN 881 from Buckman Laboratories Inc. Cationic biocides, such as (1) cationic poly(oxyethylene (dimethylamino)-ethylene (dimethylamino) ethylene dichloride) (Busan 77, available from Buckman Laboratories Inc.); (2) a cationic blend of methylene bisthiocyanate and dodecyl guanidine hydrochloride (available as SLIME TROL RX-31, RX-32, RX-32P, RX-33, from Betz Paper Chem Inc.); (3) a cationic blend of a sulfone, such as bis(trichloromethyl) sulfone and a quaternary ammonium chloride (available as SLIME TROL RX-36 DPB-865 from Betz Paper Chem. Inc.); (4) a cationic blend of methylene bis thiocyanate and chlorinated phenols (available as SLIME-TROL RX-40 from Betz Paper Chem Inc.); and the like.

The coatings of the present invention can be applied to the substrate by any suitable technique. For example, the layer coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. Once the desired amount of coating has been applied to the web, the coating is dried, typically at from about 25° C. to about 100° C. in an air dryer.

Typically, the thickness of each coating layer is from about 0.1 to about 25 microns and preferably from about 0.5 to 10 microns, although the thickness can be outside of these ranges. Generally, the combined thickness of the first and second coating layer is from about 1 to about 30 microns and preferably from about 3 to 20 microns, although the thickness can be outside of these ranges. The combined thickness of the third and fourth coating layer is from about 1 to about 30 microns and preferably from about 3 to 20 microns, although the thickness can be outside of these ranges.

The preferred ink compositions employed for testing transparencies of the present application is comprised of the following: (A) a vehicle such as derivatives of oxazoline; (B) a colorant such as known colorants, inclusive of alkylated dyes or pigments and (C) a lightfast composition.

(A) The ink vehicle derivatives of oxazoline, such as distearyl oxazoline illustrated by the following formula, can be synthesized as follows

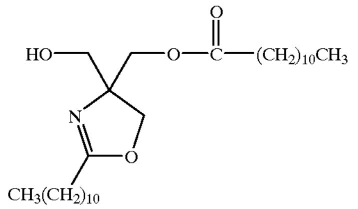

To a one liter Parr reactor equipped with a bottom drain valve, double turbine agitator, and distillation receiver with a cold water condenser were charged 568 grams of steric acid, 120 grams of tris(hydroxymethyl) amino methane and 0.6 gram of butyltin hydroxide oxide as the catalyst. The reactor, exposed to the atmosphere, was slowly heated to 100° C., and stirring was commenced. The reactor was carefully heated to a final temperature of 180° C. and kept constant for 30 minutes. As the condensation reaction to yield the product distearyl-oxazoline progressed, water, the byproduct was distilled and collected. House vacuum was then applied to remove the final residual traces of water. The reaction was then cooled to 75° C., and discharged as pale yellow liquid, which solidified to an off-white solid upon further cooling. The melting point of the solid was between 61° C. to 62° C. $^1$H NMR and IR spectroscopy confirmed the structure of the material.

(B) Dye examples are (1) 1-n-octylamino-9,10-anthracene dione red dye; (2) 1,8-bis-octadecylamino-9,10-anthracene dione red dye; (3) 1,5-bis-octadecylamino-9,10-anthracene dione red dye; (4) 4,11-diamino-2-n-octadecyl-1H-naphth[2,3-f] isoindole-1,3,5,10(2H)-tetrone cyan dye; (5) 1,4-diamino-2,3-dicyano-9,10-anthraquinone cyan dye; (6) 1,4-bis-noctylamino-9,10-anthracene dione blue dye; and (7) 1,5-bisdodecanethioanthraquinone yellow dye. These dyes, and other similar dyes were synthesized as follows:

(B-Red) The red alkylated dyes are derivatives of 9,10-anthracenedione such as 1-n-octylamino-9,10-anthracenedione, 1-n-octadecylamino-9,10-anthracenedione; 1,5-bis-octadecylamino-9,10-anthracenedione; 1,8-bis-octadecylamino-9,10-anthracenedione, and the like.

(B-Red-1) Synthesis of 1-n-octylamino-9,10-anthracene dione red dye, 1-chloro-9,10-anthracenedione (2.42 grams, 0.01 moles), 4.1 milliliters of (0.025 mole) n-octylamine and 25 milliliters of o-dichlorobenzene were refluxed for 18 hours. The reaction mixture was cooled to 25° C. and 25 milliliters of toluene were added. This solution was then subjected to chromatography through 75 grams of aluminum oxide 90 basic, activity 1, (70 to 230 mesh ) using toluene as eluant. The red fraction was collected, solvent removed under vacuum and the final product recrystallized from ethanol yielding 2.7 grams of 1-n-octylamino-9,10-anthracenedione red dye with a melting point of 98° C.

(B-Red-2) Synthesis of 1-n-octadecylamino-9,10-anthracene dione red dye. The procedure is similar to that used for the synthesis of 1-n-octylamino-9,10-anthracenedione Red B cyan dye except that n-octylamine is replaced with n-octadecylamine.

(B-Red-3) Synthesis of 1,5-bis-octadecylamino-9,10-anthracene dione red dye: 2.8 grams (0.01 mole) of 1,5-dichloro-9,10-anthracene dione, 6.7 grams (0.025 moles) and 70 milliliters of o-dichlorobenzene were refluxed together for 18 hours. The remainder of the process is the same as in the synthesis of 1-n-octylamino-9,10-anthracenedione red dye.

(B-Red-4) Synthesis of 1,8-bis-octadecylamino-9,10-anthracene dione red dye: 5.5 grams (0.02 mole) of 1,8-dichloro anthraquinone, 13.4 grams (0.025 mole), n-ocadecylamine, 5.8 grams sodium acetate and 125 milliliters pyridine were heated for 18 hours at 85° C. The mixture was cooled and poured into 1.5 liters of 10 percent hydrochloric acid solution. The aqueous mixture was extracted with three washings with hexane using 500 milliliters each time. The hexane solution was washed with 500 milliliters water. The solution was vacuum dried and the resulting solid was washed with 250 milliliters methanol to remove residual pyridine and the starting material. The end product was recrystallized from glacial acetic acid to yield 5.5 grams of red solid with a melting point of 90° C.

(B-Blue) The blue alkylated dyes selected in the hot melt ink compositions were derivatives of 9,10-anthracenedione, such as 1,4-bis-n-octylamino-9,10-anthracene dione; 1,4-bis-n-octadecylamino-9,10-anthracene dione; derivatives of diamino anthraquinone, such as 1,4-diamino-2,3-dicyano-9,10-anthraquinone, as well as derivatives of 1H-naphth[2,3-f]isoindole-1,3,5,10(2H)-tetrone, such as 4,11-diamino-2-n-octyl-1H-naphth[2,3-f]isoindole-1,3,5,10(2H)-tetrone; 4,11-diamino-2-n-octadecyl-1H-naphth[2,3-f] isoindole-1,3,5,10 (2H)-tetrone.

(B-Blue-1) Synthesis of 1,4-bis-n-octylamino-9,10-anthracene dione blue dye. In a 100 milliliter round bottom flask equipped with a reflux condenser and a drying tube were placed 2.4 grams (0.01 mole) of leuco quinizarin, 10 milliliters (0.06 mole) n-octylamine and 300 milliliters of pyridine. The mixture was heated under reflux with stirring for 18 hours. The reaction mixture was cooled to 25° C. and poured into 100 milliliters of 10 percent aqueous hydrochloric acid. The mixture was stirred for one hour and after that period the aqueous liquid was filtered. The resulting solid was dissolved in 300 milliliters of refluxing cyclohexane and filtered to remove any undissolved starting material. The solvent cyclohexane was removed under vacuum and the resulting solid was washed with excess methanol, dried at 70° C. to obtain 1,4-bis-n-octylamino-9,10-anthracenedione [MP 72–74° C].

(B-Blue-2) Synthesis of 1,4-bis-n-octadecylamino-9,10-anthracene dione blue dye. The procedure was similar to that used for the synthesis of 1,4-bis-n-octylamino-9,10-anthracenedione blue dye except that n-octyl amine is replaced with octadecyl amine. The final product of 1,4 -bis-n-octadecyl amino-9,10-anthracenedione blue dye had a melting point of 89° C.

(B-Cyan-3) Synthesis of 1,4-diamino-2,3-dicyano-9,10-anthraquinone cyan dye: To a suspension of 10 grams of 1,4-diamino anthraquinone in 90 milliliters of dimethylsulfoxide at 120° C. were added 12.5 grams of sodium cyanide. To this mixture were added 5 grams of ammonium chloride over a period of 15 minutes and the reaction mixture was heated for three hours at 120° C. The reaction mixture was cooled and diluted with 300 milliliters of methanol. The mixture was then filtered and the precipitate washed with methanol until the filtrate was colorless. On drying at room temperature 5 grams of 1,4-diamino-2,3-dicyano-9,10-anthraquinone cyan dye was obtained.

(B-Cyan-4) Synthesis of 4,11-diamino-2-n-octyl-1H-naphth[2,3-f] isoindole-1,3,5,10(2H)-tetrone cyan dye. To 120 grams of 15 percent oleum (fuming sulfuric acid having 15 percent sulfur trioxide), 10.0 grams of 1,4-diamino anthraquinone-2,3-dinitrile were added at 30° C. and the mixture stirred for two hours. This reaction mixture was poured into 1,000 grams of ice water and the precipitates were filtered. The wet precipitates were added to 400 grams of cooled water and dissolved by the addition of sodium hydroxide, followed by adjusting pH to 12.5. The temperature was now raised to 100° C. and maintained for two hours. After that period, 20 grams of 50 percent sulfuric acid were added to the mixture and heating was continued for another one hour. The precipitate of 1,4-diamino anthraquinone-2,3-dicarboxylic acid anhydride thus obtained was collected by filtration, washed with water and dried. 3.2 Grams of 1,4-diamino anthraquinone-2,3-dicarboxylic acid anhydride (0.01 mole), 3.2 grams (0.025 mole) of n-octyl amine, and 50 milliliters of methanol were added to a 100 milliliter round-bottom flask equipped with a condenser and the contents refluxed for a period of 24 hours. The reaction mixture was cooled, filtered and washed twice with methanol (100 milliliters each time). The reaction product was dried in air to obtain 4,11-diamino-2-n-octyl-1H-naphth[2,3-f] isoindole-1,3,5,10(2H)-tetrone cyan dye.

(B-Cyan-5) Synthesis of 4,11 -diamino-2-n-octadecyl-1H-naphth[2,3-f] isoindole-1,3,5,10(2H)-tetrone cyan dye: The procedure is similar to that used for the synthesis of 4,11-diamino-2-n-octyl-1H-naphth[2,3-f] isoindole-1,3,5,10 (2H)-tetrone cyan dye except that n-octylamine is replaced with n-octadecylamine.

(B-Yellow-1) Synthesis of 1,5-bisdodecanethioanthraquinone. 1,5-Dichloroanthraquinone, 54 grams (0.2 mole), was added at room temperature with stirring to a mixture of dimethylformamide, 600 milliliters, dodecane thiol, 90.5 grams (0.45 mole), and potassium carbonate, 100 grams. The suspension was heated at reflux (bp 153° C.) for 24 hours, cooled to room temperature and then poured into 2 liters of methanol. The resulting precipitate was then filtered and washed with 2 liters of water, and then 2 liters of methanol. The product was recrystalized from toluene to yield 73 grams (60 percent) of 1,5-bisdodecanethioanthraquione with a melting point of 97° C. to 99° C.

Suitable colorants present in an effective amount generally of from about 1 to about 20, or preferably, for example, from 2 to about 10 percent by weight, include pigments and dyes, with solvent dyes and alkylated dyes being preferred. Any dye or pigment may be chosen provided that it is capable of being dispersed or dissolved in the vehicle and is compatible with the other ink components. Colorant includes pigments, dyes, mixtures thereof, mixtures of dyes, mixtures of pigments, and the like.

Examples of suitable colorants include pigments such as Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700

(BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan II (Red Orange), (Matheson, Colemen Bell), Sudan I (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (DuPont), Paliogen Black L0084 (BASF), Pigment Black K801 (BASF), and carbon blacks such as REGAL 330® (Cabot), Carbon Black 5250, and Carbon Black 5750 (Columbia Chemical Company).

Dye examples are Pontamine; Food Black 2; Carodirect Turquoise FBL Supra Conc.(Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes, and within the class of solvent dyes, spirit soluble dyes are preferred because of their compatibility with the vehicles and dye leveling agents of the present application. Examples of suitable spirit solvent dyes include Neozapon Red 492 (BASF), Orasol Red G (Ciba-Geigy), Direct Brilliant Pink B (Crompton - Knolls), Aizen Spilon Red C-BH (Hodagaya Chemical Company), Kayanol Red 3BL (Nippon Kayaku Company).Levanol Brilliant Red 3BW (Mobay Chemical Company), Levaderm Lemon Yellow (Mobay Chemical Company), Spirit Fast Yellow 3G, Aizen Spilon Yellow C-GNH (Hodogaya Chemical Company), Sirius Supra Yellow GD 167, Cartasol Brilliant Yellow 4GF (Sandoz), Pergasol Yellow CGP (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc. A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

The ink compositions may also, and preferably contain additives such as antioxidant lightfast compounds present in amounts of, for example, from about 0.5 to about 7 parts by weight and preferably from about 1 to about 5 parts by weight, including (1) didodecyl-3,3'-thio dipropionate #D12,840-6, Aldrich Chemical Company; (2) ditetradecyl-3,3'-thiodipropionate, #41,312-7, Aldrich Chemical Company; (3) dioctadecyl-3,3'-thiodipropionate, #41,310-7, Aldrich Chemical Company; (4) N,N'-β,β'-naphthalene-ρ-phenylene diamine, Anchor Corporation; (5) 2,2,4-trimethyl-1,2-hydroquinoline, available as Vulkanox HS from Mobay Corporation; (6) 6-ethoxy-1,2-dihydro-2,2,4-trimethyl quinoline, Santoflex AW Monsanto Chemicals; and the like.

Optional ink additives, including more specifically, biocides such as DOWICIL 150, 200, and 75, benzoate salts, sorbate salts, and the like, present in effective amounts, such as for example an amount of from about 0.0001 to about 4 percent by weight, and preferably from about 0.01 to about 2.0 percent by weight; pH controlling agents such as acids, or bases, phosphate salts, carboxylates salts, sulfite salts, amine salts, and the like, each present, for example, in an amount of from 0 to about 1 percent by weight and preferably from about 0.01 to about 1 percent by weight, based on the weight of the ink components.

The examples of ink components recited herein represent examples, thus other suitable components not specifically recited may also be selected in embodiments of the present invention.

The inks of the present invention can be prepared by any suitable method. For example, a colored semi-solid hot melt ink composition was prepared by mixing 90 percent by weight of an alkylated cyclicoxazoline vehicle having an acoustic-loss value of between 20 and 40 dB/millimeters, 5 percent by weight of lightfast alkylated antioxidant and 5 percent by weight of an alkylated colorant. The mixture can then be heated to a temperature of about 100° C. and stirred for a period of about 30 minutes until it forms a homogeneous solution, and subsequently it is cooled to 25° C.

The inks are particularly suitable for substrates, such as paper, transparency material, or the like, and which inks are subjected to heat during the printing cycle. When transparency substrates are selected, temperatures typically are from about 100° C. to about 110° C., since the polyester typically employed as the base sheet tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

Transparencies of the present invention in embodiments exhibit reduced curl upon being printed with aqueous inks, particularly in situations wherein the ink image is dried by exposure to microwave radiation. Generally, the term "curl" refers to the distance between the base line of the arc formed by the transparency or recording sheet when viewed in cross-section across its width (or shorter dimension, for example, 8.5 inches in an 8.5 by 11 inch sheet, as opposed to length, or longer dimension, for example, 11 inches in an 8.5 by 11 inch sheet) and the midpoint of the arc. To measure curl, a sheet can be held with the thumb and forefinger in the middle of one of the long edges of the sheet (for example, in the middle of one of the 11 inch edges in an 8.5 by 11 inch sheet) and the arc formed by the sheet can be matched against a pre-drawn standard template curve.

The transparencies of the present invention in embodiments exhibit little or no blocking. Blocking refers to the transfer of ink or toner from a printed image from one sheet to another when recording sheets are stacked together. The recording sheets of the present invention exhibit substantially no blocking under, for example, environmental conditions of from about 20 to about 80 percent relative humidity and at temperatures of about 80° F.

Further, the transparencies of the present invention in embodiments exhibit high resistance to humidity. Resistance to humidity generally is the capacity of a recording sheet to control the blooming and bleeding of printed images, wherein blooming represents intra-diffusion of dyes and bleeding represents inter-diffusion of dyes. The blooming test can be performed by printing a bold filled letter such as "T" on a recording sheet and placing the sheet in a constant environment chamber preset for humidity and temperature. The vertical and horizontal spread of the dye in the letter "T" is monitored periodically under a microscope. Resistance to humidity limit is established when the dyes selected begin to diffuse out of the letter "T". The bleeding test is performed by printing a checker board square pattern of various different colors and measuring the inter-diffusion of colors as a function of humidity and temperature.

The optical density measurements were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

Acoustic-loss measurements recited herein were measured as follows. Samples of various cyclic solid surface leveling compounds were placed between two transducers with the temperature set at 150° C. The samples were allowed to equilibrate at 150° C. for five minutes. The two transducers were brought together to maximize the acoustic signal. The amplitude and the position of the signals were recorded. The two transducers were then separated by a distance varying from 25.4 microns to 125.4 microns recording each time the amplitude and the position of the signal. Each measurement was performed three times and three samples of the same material were measured. The attenuation dB/millimeters was then calculated by rationing the amplitude values obtained at different separation distances. The solid cyclic oxazoline compounds had dB/millimeters values of from about 20 to about 40. A value of less than 80 dB/millimeters for the ink composition is of importance with respect to acoustic jetting processes.

The drying time of images obtained with the transparencies of the present application is the time for zero image offset and can be measured as follows. A line comprising different color sequences is drawn on the transparency with droplets of inks from an ink jet printhead moving from left to right and back. Thereafter, this image is purposely smeared with the pinch roll of the printer by fast forwarding the transparency mechanically while the pinch roll is on the top of the imaged line. This entire procedure takes about two seconds to complete. In the event that no offset of the printed image on the unprinted paper or transparency occurs, the drying time of the image is considered as less than two seconds.

Haze values were measured by an XL-211 Hazegard Hazemeter supplied by Pacific Scientific Company.

The lightfast values of the ink jet images were measured in the Mark V Lightfast Tester obtained from Microscal Company, London, England.

Specific embodiments of the invention will now be described in detail. These Examples are intended to be illustrative, and the invention is not limited to the materials, conditions, or process parameters set forth in these embodiments. The coatings, a total of four are included on both surfaces or sides of the transparency unless otherwise indicated. All parts and percentages are by weight unless otherwise indicated.

EXAMPLE I

Twenty transparency sheets were prepared by the solvent extrusion process (single side each time initially) on a Faustel Coater using a one slot die by providing for each a MYLAR™ base sheet (roll form) with a thickness of 100 microns, and coating the front side of the base sheet with a hydrophobic heat dissipating antistatic coating comprised of 85 parts by weight of poly[penta bromobenzyl] acrylate available as FR-1025 from Dead Sea Bromine Corporation, and 15 parts by weight of the anionic antistatic compound monoester sulfosuccinate Alkasurf SS-L7DE, available from Alkaril Chemicals, which blend was present in a concentration of 5 percent by weight in toluene. Subsequent to air drying at 100° C. and monitoring the difference in weight prior to and subsequent to coating, the dried MYLAR™ base sheet rolls contained 1.0 gram in a thickness of 10 microns of the heat dissipating antistatic coating. This hydrophobic heat dissipating antistatic coating was further overcoated on a Faustel Coater using a one slot die with a hydrophilic ink receiving layer comprised of a blend of 80 parts by weight of binder polymer poly(2-ethyl-2-oxazoline) with a molecular weight, MW of 50,000 [Aldrich #37,284-4], and 3 parts by weight of the ink spreading compound didecyl oxazoline, mp. 58° C.; 5 parts by weight of the UV absorbing compound poly[N,N-bis(2,2,6,6-tetra methyl-4-piperidinyl)-1,6-hexane diamine-co-2,4-dichloro-6-morpholino-1,3,5-triazine], Cyasorb UV-3346, #41,324-0, Aldrich Chemical Company; and 2 parts by weight of the biocide 2-bromo-4'-hydroxyacetophenone (Busan 90, available from Buckman Laboratories), which blend was present in a concentration of 10 percent by weight in water. Subsequent to air drying at 100° C. and monitoring the difference in weight prior to and subsequent to coating, the dried MYLAR™ base sheet rolls contained 1.0 gram in a thickness of 10 microns of the ink receiving layer. Rewinding the coated side of the MYLAR™ base sheet (roll form) on to an empty core and using these rolls, the uncoated back side of the MYLAR™ base sheet was coated on a Faustel Coater using a one slot die with the above hydrophobic heat dissipating antistatic coating blend in a thickness of 10 microns which was further overcoated with the same above ink receiving layer as that on the front side in a thickness of 10 microns . The total thickness of the two front coatings was 20 microns and the total thickness of the two back coatings was 20 microns, for a sum total thickness of 40 microns. Each of the prepared ten transparency sheets possessed an average haze value of 4.0.

The above prepared transparencies were printed with a Xerox Corporation acoustic ink jet test fixture equipped with a plurality of heaters with temperatures ranging from 85° C. to 125° C., and preferably 100 for each heater and containing inks of the following compositions.

Cyan:

A cyan hot melt ink composition was prepared by mixing 5 parts by weight of 1,4-bis-n-octylamino-9,10-anthracenedione blue dye, 90 parts by weight of distearyl oxazoline, and 5 parts by weight of didodecyl-3,3'-thiodipropionate, Cyanox, LTDP, #D12,840-6, Aldrich Chemical Company. The resulting mixture was heated to a temperature of about 120° C. and then stirred for a period of about 30 minutes until it formed a homogeneous solution, and subsequently the solution was cooled to 25° C. The resulting cyan ink had an acoustic loss value of 39 dB/millimeter and a viscosity of 5.05 cps at 150° C.

Magenta:

A magenta hot melt ink composition was prepared by mixing 5 parts by weight of 1-n-octylamino-9,10-anthracenedione red dye, 90 parts by weight of distearyl oxazoline, and 5 parts by weight of didodecyl-3,3'-thiodipropionate, Cyanox, LTDP, #D12,840-6, Aldrich Chemical Company. The resulting mixture was heated to a temperature of about 120° C. and then stirred for a period of about 30 minutes until it formed a homogeneous solution, and subsequently the solution was cooled to 25° C. The resulting magenta ink had an acoustic loss value of 40 dB/millimeter and a viscosity of 4.75 cps at 150° C.

Yellow:

A yellow hot melt ink composition was prepared by mixing 5 parts by weight of 1,5-bisdodecanethioanthraquinone yellow dye, 90 parts by weight of distearyl oxazoline, and 5 parts by weight of didodecyl-3,3'-thiodipropionate, Cyanox LTDP, #D12,840-6, Aldrich Chemical Company. The resulting mixture was heated to a temperature of about 120° C. and then stirred for a period of about 30 minutes until it formed a homogeneous solution, and subsequently the solution was cooled to 25° C. The resulting yellow ink had an acoustic loss value of 41 dB/millimeter and a viscosity of 4.85 cps at 150° C.

Images were obtained that dried in less than a minute and had optical density values of 1.50 (cyan), 1.85 (magenta), 0.95 (yellow) with a projection efficiency of 91 percent. These images were 100 percent waterfast when washed with water for 2 minutes at 50° C. and 95 percent lightfast for a period of three months without any change in their optical density. No or minimal ink bleeding was observed.

The above prepared transparencies were further printed with a Hewlett Packard [HP] 1600C ink jet printer equipped with a dryer and images were obtained with density values of 1.40 (cyan), 1.55 (magenta), 0.95 (yellow) with a projection efficiency of 95 percent. These images were 90 percent lightfast for a period of two months without any change in their optical density. This Example shows that transparencies of the present invention designed for hot melt oxazoline inks are also suitable for aqueous thermal ink jet inks such as those of the HP printer.

In a comparative study, transparencies designed for the HP1600C printer were used in printing the oxazoline based inks of Example I. The projection efficiency value of these images as measured with a Match Scan II light photometer from Spectronic Instruments Incorporated was calculated to be 50 percent.

EXAMPLE II

Twenty transparency sheets were prepared by the solvent extrusion process (single side each time initially) on a Faustel Coater using a one slot die by providing for each a MYLAR™ base sheet (roll form) with a thickness of 100 microns, and coating the front side of the base sheet with a hydrophobic heat dissipating antistatic coating comprised of 85 parts by weight of brominated epoxy resin, available as Thermoguard 212 from M&T Corporation, and 15 parts by weight of the anionic antistatic compound monoester sulfosuccinate Alkasurf SS-L7DE, available from Alkaril Chemicals, which blend was present in a concentration of 5 percent by weight in toluene. Subsequent to air drying at 100° C. and monitoring the difference in weight prior to and subsequent to coating, the dried MYLAR™ base sheet rolls contained 1.0 gram in a thickness of 10 microns of the heat dissipating antistatic coating. This hydrophobic heat dissipating antistatic coating was further overcoated on a Faustel Coater using a one slot die with a hydrophilic ink receiving layer comprised of a blend of 85 parts by weight of the binder polymer poly(2-ethyl-2-oxazoline) with a molecular weight of 200,000 [Aldrich #37,285-4], 13 parts by weight of ink spreading compound distearyl oxazoline mp. 62° C., 5 parts by weight of UV absorbing compound poly[N,N-bis (2,2,6,6-tetra methyl-4 -piperidinyl)-1,6-hexane diamine-co-2,4-dichloro-6-morpholino-1,3,5-triazine], Cyasorb UV-3346, #41,324-0, Aldrich Chemical Company; and 2 parts by weight of the biocide an anionic potassium N-hydroxy methyl-N-methyl-dithiocarbamate (available as BUSAN 40 from Buckman Laboratories Inc.), which blend was present in a concentration of 10 percent by weight in water. Subsequent to air drying at 100° C. and monitoring the difference in weight prior to and subsequent to coating, the dried MYLAR™ base sheet rolls contained 1.0 gram in a thickness of 10 microns of the ink receiving layer. Rewinding the coated side of the MYLAR™ base sheet (roll form) on to an empty core and using these rolls, the uncoated back side of the MYLAR™ base sheet was coated on a Faustel Coater using a one slot die with the above hydrophobic heat dissipating antistatic coating blend in a thickness of 10 microns, which was further overcoated with the same above ink receiving layer as that on the front side in a thickness of 10 microns. The total thickness of the two front coatings was 20 microns and the total thickness of the two back coatings was 20 microns, for a total sum thickness of 40 microns. Each of the ten prepared transparency sheets had an average haze value of 5.0.

The above prepared transparencies were printed with a Xerox Corporation acoustic ink jet test fixture equipped with a plurality of heaters with temperatures ranging from 85° C. to 125° C., and preferably 100° C. for each heater and containing inks of the following compositions.

Cyan:

A cyan hot melt ink composition was prepared by mixing 5 parts by weight of 4,11-diamino-2-n-octadecyl-1H-naphth [2,3-f]isoindole-1,3,5,10(2H)-tetrone cyan dye, 90 parts by weight of distearyl oxazoline, and 5 parts by weight of dioctadecyl-3,3'-thiodipropionate, #41,310-0, Aldrich Chemical Company. The resulting mixture was heated to a temperature of about 120° C. and then stirred for a period of about 30 minutes until it formed a homogeneous solution, and subsequently the solution was cooled to 25° C. The resulting cyan ink had an acoustic loss value of 40 dB/millimeter and a viscosity of 5.0 cps at 150° C.

Magenta:

A magenta hot melt ink composition was prepared by mixing 5 parts by weight of 1,5-bis-octadecylamino-9,10-anthracene dione red dye, 90 parts by weight of distearyl oxazoline, and 5 parts by weight of dioctadecyl-3,3'-thiodipropionate, #41,310-0, Aldrich Chemical Company. The resulting mixture was heated to a temperature of about 120° C. (Centigrade throughout) and then stirred for a period of about 30 minutes until it formed a homogeneous solution, and subsequently the solution was cooled to 25° C. The resulting magenta ink had an acoustic loss value of 40 dB/millimeter and a viscosity of 4.80 cps at 150° C.

Yellow:

A yellow hot melt ink composition was prepared by mixing 5 parts by weight of 1,5-bisdodecanethioanthraquinone yellow dye, 90 parts by weight of distearyl oxazoline, and 5 parts by weight of dioctadecyl-3,3'-thiodipropionate, #41,310-0, Aldrich Chemical Company. The resulting mixture was heated to a temperature of about 120° C. and then stirred for a period of about 30 minutes until it formed a homogeneous solution, and subsequently the solution was cooled to 25° C. The resulting yellow ink had an acoustic loss value of 41 dB/millimeter and a viscosity of 4.95 cps at 150° C.

Images were obtained that dried in less 40 seconds and had optical density values of 1.60 (cyan), 1.85 (magenta), and 0.88 (yellow) with a projection efficiency of 95 percent. These images were 98 percent waterfast when washed with water for 2 minutes at 50° C. and 92 percent lightfast for a period of three months without any change in their optical density.

EXAMPLE III

Twenty transparency sheets were prepared by the solvent extrusion process (single side each time initially) on a Faustel Coater using a one slot die by providing for each a MYLAR™ base sheet (roll form) with a thickness of 100 microns, and coating the front side of the base sheet with a hydrophobic heat dissipating antistatic coating comprised of 85 parts by weight of poly[penta bromobenzyl] acrylate available as FR-1025 from Dead Sea Bromine Corporation and 15 parts by weight of the anionic antistatic compound monoester sulfosuccinate Alkasurf SS-L7DE, available from Alkaril Chemicals, which blend was present in a concentration of 5 percent by weight in toluene. Subsequent to air drying at 100° C. and monitoring the difference in weight prior to and subsequent to coating, the dried MYLAR™ base sheet rolls contained 1.0 gram in a thickness of 10 microns of the heat dissipating antistatic coating. This hydrophobic heat dissipating antistatic coating was further overcoated on a Faustel Coater using a one slot die with a hydrophilic ink receiving layer comprised of a dispersion of 85 parts by weight of the polymer binder poly(2-ethyl-2-oxazoline) with a molecular weight of 500,000 [Aldrich #37,397-4], 13 parts by weight of ink spreading compound dicyclohexyl oxazoline mp. 65° C., 5 parts by weight of UV absorbing compound poly[N,N-bis(2,2,6,6-tetra methyl-4-piperidinyl)-1,6-hexane diamine-co-2,4-dichloro-6-morpholino-1,3,5-triazine], Cyasorb UV-3346, #41,324-0, Aldrich Chemical Company, and 2 parts by weight of the biocide anionic potassium N-hydroxy methyl-N-methyl-dithiocarbamate (available as BUSAN 40 from Buckman Laboratories Inc.); which blend was present in a concentration of 10 percent by weight in water. Subsequent to air drying at 100° C. and monitoring the difference in weight prior to and subsequent to coating, the dried MYLAR™ base sheet rolls contained 1.0 gram in a thickness of 10 microns of the ink receiving layer. Rewinding the coated side of the MYLAR™ base sheet (roll form) on to an empty core and using these rolls, the uncoated back side of the MYLAR™ base sheet was coated on a Faustel Coater using a one slot die with the above hydrophobic heat dissipating antistatic coating blend in a thickness of 10 microns, which was further overcoated with the same above ink receiving layer as that on the front side in a thickness of 10. The total thickness of the two front coatings was 20 microns and the total thickness of the two back coatings was 20 microns, thus the sum total thickness was 40 microns. Each of the ten prepared transparency sheets had an average haze value of 4.5.

The above prepared transparencies were printed with a Xerox Corporation acoustic ink jet test fixture equipped with a plurality of heaters with temperatures ranging from 85° C. to 125° C., and preferably 100° C. for each heater and containing inks of the following compositions.

Cyan:

A cyan hot melt ink composition was prepared by mixing 5 parts by weight of 1,4-diamino-2,3-dicyano-9,10-anthraquinone cyan dye; 90 parts by weight of distearyl oxazoline, and 5 parts by weight of ditetradecyl-3,3'-thiodipropionate, #41,312-7, Aldrich Chemical Company. The resulting mixture was heated to a temperature of about 120° C. and then stirred for a period of about 30 minutes until it formed a homogeneous solution, and subsequently the solution was cooled to 25° C. The resulting cyan ink had an acoustic loss value of 40 dB/millimeter and a viscosity of 5.1 cps at 150° C.

Magenta:

A magenta hot melt ink composition was prepared by mixing 5 parts by weight of 1,8-bis-octadecylamino-9,10-anthracene dione red dye, 90 parts by weight of distearyl oxazoline, and 5 parts by weight of ditetradecyl-3,3'-thiodipropionate, #41,312-7, Aldrich Chemical Company. The resulting mixture was heated to a temperature of about 120° C. and then stirred for a period of about 30 minutes until it formed a homogeneous solution, and subsequently the solution was cooled to 25° C. The resulting magenta ink had an acoustic loss value of 42 dB/millimeter and a viscosity of 4.85 cps at 150° C.

Yellow:

A yellow hot melt ink composition was prepared by mixing 5 parts by weight of 1,5-bisdodecanethioanthraquinone yellow dye, 90 parts by weight of distearyl oxazoline, and 5 parts by weight of ditetradecyl-3,3'-thiodipropionate, #41,312-7, Aldrich Chemical Company. The resulting mixture was heated to a temperature of about 120° C. and then stirred for a period of about 30 minutes until it formed a homogeneous solution, and subsequently the solution was cooled to 25° C. The resulting yellow ink had an acoustic loss value of 43 dB/millimeter and a viscosity of 4.95 cps at 150° C.

Images were obtained that dried in 35 seconds and had optical density values of 1.55 (cyan), 1.75 (magenta), and 0.86 (yellow) with a projection efficiency of 92 percent. These images were 96 percent waterfast when washed with water for 2 minutes at 50° C. and 95 percent lightfast for a period of three months without any change in their optical density.

The preferred components of the transparency with a first layer coating, in a thickness of 10 microns, are about 85 percent by weight of poly[penta bromobenzyl] acrylate available as FR-1025 from Dead Sea Bromine Corporation, and about 15 parts by weight of the anionic antistatic compounds monoester sulfosuccinate Alkasurf SS-L7DE, available from Alkaril Chemicals, and an ink receiving layer in a thickness of 10 microns on the heat dissipating antistatic coating layer comprised of a blend of 80 parts by weight of poly(2-ethyl-2-oxazoline) with a molecular weight $M_w$ of 50,000 [Aldrich #37,284-4], 13 parts by weight of ink spreading compound didecyl oxazoline, and 5 parts by weight of UV absorbing compound poly[N,N-bis(2,2,6,6-tetra methyl-4-piperidinyl)-1,6-hexane diamine-co-2,4-dichloro-6-morpholino-1,3,5-triazine], Cyasorb UV-3346, #41,324-0, Aldrich Chemical Company, and 2 parts by weight of the biocide 2-bromo-4'-hydroxyacetophenone (BUSAN 90, available from Buckman Laboratories, and which transparency possesses a haze value of from about 0.5 to about 10 and a lightfast value of from about 95 to about 98.

Other embodiments and modifications of the present invention may occur to those skilled in the art subsequent to a review of the information presented herein; these embodiments and modifications, and equivalents thereof, are also included within the scope of this invention.

What is claimed is:

1. A transparency comprised of a supporting substrate, and thereover two coatings, (1) a heat dissipating coating layer in contact with the substrate, and wherein said coating is comprised of a heat dissipating binder optionally with a melting point in the range of from between about 100° C. to about 260° C. and an antistatic compound; and (2) an ink receiving coating layer thereover comprised of a blend of a binder polymer, an alkylated oxazoline, a lightfast UV compound, and an optional biocide.

2. A transparency in accordance with claim 1 and wherein said substrate contains thereunder said coatings and thereover said coatings.

3. A transparency in accordance with claim 1 wherein the binder of the heat dissipating antistatic layer is a polymer selected from the group consisting of (1) halogenated polystyrene, (2) poly[penta bromobenzyl] acrylate, (3) halogenated polyesters, (4) halogenated polyureas, (5) halogenated epoxy resins, (6) cellulose acetate hydrogen phthalates, (7) hydroxypropylmethyl cellulose phthalate, (8) polyethylenecarbonate, (9) polyester latex, and (10) a butadiene-acrylonitrile-styrene terpolymer latex.

4. A transparency in accordance with claim 1 wherein the coatings are contained thereover and thereunder said substrate and the binder of the heat dissipating layer is a polymer selected from the group consisting of (1) poly[penta bromobenzyl]acrylate, (2) halogenated polyesters, (3) halogenated polyureas, (4) halogenated epoxy resins, and (5) polyethylenecarbonate, and wherein said polymer is present in amounts of from about 50 to about 95 parts by weight.

5. A transparency in accordance with claim 1 wherein said antistatic compound is selected from the group consisting of anionic compounds and cationic compounds.

6. A transparency in accordance with claim 2 wherein the heat dissipating compound is selected from the group consisting of (1) poly[pentabromo benzyl]acrylate, (2) halogenated polyesters, and (3) halogenated polyureas, and which component is present in amounts of from about 50 to about 5 parts by weight.

7. A transparency in accordance with claim 1 wherein the thickness of the heat dissipating coating layer in contact with the substrate is from about 0.1 to about 25 microns.

8. A transparency in accordance with claim 1 wherein the binder polymer for the ink receiving layer is selected from the group consisting of (1) poly(2-ethyl-2-oxazoline, (2) 1-[N-[poly(3-allyloxy-2-hydroxypropyl)]-2-aminoethyl]-2-imidazolidinone, (3) poly(1-vinylpyrrolidone)-graft-(1-triacontene), (4) poly(1-vinyl pyrrolidone)-graft-(1-hexadecene), (5) poly(coumaronone-co-indene), and mixtures thereof, and which binder polymer is present in amounts of from about 20 parts by weight to about 82 parts by weight.

9. A transparency in accordance with claim 1 wherein the binder polymer of the ink receiving layer situated on the top of the first heat dissipating layer is selected from the group consisting of (1) poly(2-ethyl-2-oxazoline), (2) poly(1-vinylpyrrolidone)-graft-(1-triacontene), and (3) poly(1-vinyl pyrrolidone)-graft-(1-hexadecene).

10. A transparency in accordance with claim 1 wherein said alkylated oxazoline compound of the ink receiving layer functions primarily as an ink spreading compound and which compound is selected from the group consisting of mono alkyloxazolines and dialkyloxazolines, wherein alkyl contains from about 2 to about 30 carbon atoms, and wherein said oxazoline possesses a melting point of between about 40° C. to about 60° C.

11. A transparency in accordance with claim 1 wherein the alkylated oxazoline compound of the ink receiving layer is selected from the group consisting of (1) dodecyl oxazoline, (2) tetradecyl oxazoline, (3) triacontane oxazoline, (4) dihexyl oxazoline, (5) dioctyl oxazoline, (6) didecyl oxazoline, (7) didodecyl oxazoline, (8) ditetradecyl oxazoline, (9) distearyl oxazoline, and (10) ditriacontane oxazoline; and wherein said oxazoline is optionally present in amounts of from about 12 parts by weight to about 65 parts by weight.

12. A transparency in accordance with claim 1 wherein said UV lightfast compound is selected from the group consisting of (1) 2-(2'-hydroxy-5'-methylphenyl) benzotriazole; (2) [1,2,2,6,6-pentamethyl-4-piperidinyl/β,β,β',β'-tetramethyl-3,9-(2,4,8,10-tetra oxospiro-(5,5)-undecane) diethyl]-1,2,3,4-butane tetracarboxylate; (3) 2-dodecyl-N-(1,2,2,6,6-pentamethyl-4-piperidinyl) succinimide; (4) poly(3,5-di-tert-butyl-4-hydroxyhydrocinnamic acid ester)/1,3,5-tris(2-hydroxyethyl)-5-triazine-2,4,6(1H, 3H,5H)-trione; and (5) poly[N,N-bis(2,2,6,6-tetramethyl-4-piperidinyl)-1,6-hexane diamine-co-2,4-dichloro-6-morpholino-1,3,5-triazine.

13. A transparency in accordance with claim 1 wherein said UV compound is selected from the group consisting of (1) [1,2,2,6,6-pentamethyl-4-piperidinyl/β,β,β',β'-tetramethyl-3,9-(2,4,8,10-tetraoxospiro-(5,5)-undecane) diethyl]-1,2,3,4-butane tetracarboxylate; (2) 2-dodecyl-N-(1,2,2,6,6-pentamethyl-4-piperidinyl) succinimide; (3) poly [N,N-bis(2,2,6,6-tetramethyl-4-piperidinyl)-1,6-hexane diamine-co-2,4-dichloro-6-morpholino-1,3,5-triazine; and wherein said UV compound is present in amounts of from about 5 parts by weight to about 12 parts by weight.

14. A transparency in accordance with claim 1 wherein said biocide of the ink receiving layer is selected from the group consisting of (1) nonionic compounds, (2) anionic compounds, and (3) cationic compounds.

15. A transparency in accordance with claim 1 wherein the biocide of the ink receiving layer is selected from the group consisting of (1) nonionic 2-bromo-4'-hydroxyacetophenone; (2) anionic potassium N-hydroxy methyl-N-methyl-dithiocarbamate; (3) cationic poly (oxyethylene(dimethyl amino)-ethylene(dimethylamino) ethylene dichloride); and wherein said biocide is present in amounts of from about 1 part by weight to about 3 parts by weight.

16. A transparency in accordance with claim 1 wherein the thickness of the second ink receiving coating layer in contact with the first layer is from about 0.1 to about 25 microns.

17. A transparency in accordance with claim 1 with a haze value of from about 0.5 to about 5.

18. A transparency in accordance with claim 1 with a lightfast value of from about 90 to about 98 percent.

19. A transparency in accordance with claim 1 and which transparency possesses a haze value of from about 0.5 to about 5, a projection efficiency of about 90 to about 95 percent, and a lightfast value of from about 90 to about 98 percent.

20. A transparency in accordance with claim 1 wherein the substrate is selected from the group consisting of (1) polyethylene terephthalate, (2) polyethylene naphthalates, (3) polycarbonates, (4) polysulfones, (5) polyether sulfones, (6) poly(arylene sulfones), (7) cellulose triacetate, (8) polyvinyl chloride, (9) cellophane, (10) polyvinyl fluoride, (11) polypropylene, and (12) polyimides.

21. A transparency in accordance with claim 1 wherein said melting point of said heat dissipating binder is from about 100° C. to about 200° C., and wherein said transparency possesses a haze value of from about 0.5 to about 10 and a lightfast value of from about 95 to about 98.

22. A transparency in accordance with claim 1 wherein the heat dissipating antistatic coating is a polymer of a poly [penta bromobenzyl] acrylate, a halogenated polyester, or a halogenated polyurea; said antistatic compound is monoester sulfosuccinate, or a quaternary acrylic copolymer latex; said second ink receiving layer polymer is poly(2-ethyl-2-oxazoline), poly(1-vinylpyrrolidone)-graft-(1-triacontene), or poly(1-vinyl pyrrolidone)-graft-(1-hexa decene); said alkylated oxazoline is triacontane oxazoline, didodecyl oxazoline, or distearyl oxazoline; said lightfast UV compound of the ink receiving layer is [1,2,2,6,6-pentamethyl-4-piperidinyl/β,β,β',β'-tetramethyl-3,9-(2,4,8,10-tetraoxospiro-(5,5)-undecane) diethyl]-1,2,3,4-butane tetracarboxylate, or poly[N,N-bis(2,2,6,6-tetramethyl-4-piperidinyl)-1,6-hexane diamine-co-2,4-dichloro-6-morpholino-1,3,5-triazine; said biocide of the ink receiving layer is cationic poly(oxyethylene(dimethylamino)-ethylene (dimethylamino)ethylene dichloride), or an anionic potassium N-hydroxymethyl-N-methyl-dithiocarbamate, and which transparency possesses a haze value of from about 0.5 to about 10 and a lightfast value of from about 95 to about 98.

23. A transparency in accordance with claim 22 wherein the coating is of a thickness of about 10 microns, and contains about 85 percent by weight of poly[penta bromobenzyl] acrylate; and about 15 parts by weight of the anionic antistatic compounds monoester sulfosuccinate and an ink receiving layer in a thickness of 10 microns on the heat dissipating antistatic coating layer comprised of a blend of about 80 parts by weight of poly(2-ethyl-2-oxazoline); about 13 parts by weight of ink spreading compound didecyl oxazoline; about 5 parts by weight of UV absorbing compound poly[N,N-bis(2,2,6,6-tetramethyl-4-piperidinyl)-1,6-hexane diamine-co-2,4-dichloro-6morpholino-1,3,5-triazine]; and about 2 parts by weight of biocide 2-bromo-4'-hydroxyacetophenone, and which transparency possesses a haze value of from about 0.5 to about 10 and a lightfast value of from about 95 to about 98.

24. A transparency comprised of a supporting substrate, and thereover two coatings, (1) a first heat dissipating coating layer in contact with the substrate, and wherein said first coating is comprised of a heat dissipating binder with a melting point in the range of from between about 100° C. to about 260° C. and an antistatic compound; and (2) a second ink receiving coating layer thereover comprised of a blend of a binder polymer, and an alkylated oxazoline, a lightfast UV compound, and an biocide.

25. A transparency comprised of a supporting substrate, and thereover two coatings, (1) a first heat dissipating coating layer in contact with the substrate, and wherein said first coating is comprised of a heat dissipating binder optionally with a melting point in the range of from between about 100° C. to about 260° C. and an antistatic compound; and (2) a second ink receiving coating layer thereover comprised of a blend of a binder polymer, an alkylated oxazoline, a lightfastness, and an optional biocide.

26. A transparency comprised of a supporting substrate, and thereover two coatings, (1) a first heat dissipating coating layer in contact with the substrate, and wherein said first coating consists essentially of a heat dissipating binder optionally with a melting point in the range of from between about 100° C. to about 260° C. and an antistatic compound; and (2) a second ink receiving coating layer thereover consisting essentially of a blend of a binder polymer, and an alkylated oxazoline, a lightfast UV compound, and an optional biocide.

27. A transparency in accordance with claim 1 wherein said alkylated oxazoline is a nonpolymer.

28. A transparency comprised of a supporting substrate, and thereover two coatings, (1) a heat dissipating coating layer in contact with the substrate, and wherein said coating is comprised of a heat dissipating binder optionally with a melting point in the range of from between about 100° C. to about 260° C. and an antistatic compound; and (2) an ink receiving coating layer thereover comprised of a blend of a binder polymer, an alkylated oxazoline, a lightfast UV compound, and an optional biocide; and wherein alkylated oxazoline compound of the ink receiving later is selected from the group consisting of (1) dodecyl oxazoline, (2) tetradecyl oxazoline, (3) triacontane oxazoline, (4) dihexyl oxazoline, (5) dioctyl oxazoline, (6) didecyl oxazoline, (7) didodecyl oxazoline, (8) ditetradecyl oxazoline, (9) distearyl oxazoline, and (10) ditriacontane oxazoline.

29. A transparency comprised of a supporting substrate, and thereover two coatings, (1) a heat dissipating coating layer in contact with the substrate, and wherein said coating is comprised of a heat dissipating binder optionally with a melting point in the range of from between about 100° C. to about 260° C. and an antistatic compound; and (2) an ink receiving coating layer thereover comprised of a blend of a binder polymer, an alkylated oxazoline, a lightfast UV compound, and an optional biocide; and wherein the heat dissipating antistatic coating layer is a polymer of a poly [penta bromobenzyl] acrylate, a halogenated polyester, or a halogenated polyurea; said antistatic compound is monoester sulfosuccinate, or a quaternary acrylic copolymer latex; said second ink receiving layer polymer is poly(2-ethyl-2-oxazoline), poly(1-vinylpyrrolidone)-graft-(1-triacontene), or poly(1-vinyl pyrrolidone)-graft-(1-hexa decene); said alkylated oxazoline is triacontane oxazoline, didodecyl oxazoline, or distearyl oxazoline; said lightfast UV compound of the ink receiving layer is [1,2,2,6,6-pentamethyl-4-piperidinyl/β,β,β',β'-tetramethyl-3,9(2,4,8,10-tetraoxospiro-(5,5)-undecane) diethyl]-1,2,3,4-butane tetracarboxylate, or poly[N,N-bis(2,2,6,6-tetramethyl-4-piperidinyl)-1,6-hexane diamine-co-2,4-dichloro-6-morpholino-1,3,5-triazine; said biocide of the ink receiving layer is cationic poly(oxyethylene(dimethylamino)-ethylene (dimethylamino)ethylene dichloride), or an anionic potassium N-hydroxymethyl-N-methyl-dithiocarbamate, and which transparency possesses a haze value of from about 0.5 to about 10 and a lightfast value of from about 95 to about 98; and wherein the coating is of a thickness of about 10 microns, and contains about 85 percent by weight of poly [penta bromobenzyl] acrylate; and about 15 parts by weight of the anionic antistatic compounds monoester sulfosuccinate and an ink receiving layer in a thickness of 10 microns on the heat dissipating antistatic coating layer comprised of a blend of about 80 parts by weight of poly(2-ethyl-2-oxazoline); about 13 parts by weight of ink spreading compound didecyl oxazoline; about 5 parts by weight of UV absorbing compound poly[N,N-bis(2,2,6,6-tetramethyl-4-piperidinyl)-1,6-hexane diamine-co-2,4-dichloro-6-morpholino-1,3,5-triazine]; and about 2 parts by weight of biocide 2-bromo-4'-hydroxyacetophenone, and which transparency possesses a haze value of from about 0.5 to about 10 and a lightfast value of from about 95 to about 98.

* * * * *